US008343425B1

(12) United States Patent
Li et al.

(10) Patent No.: US 8,343,425 B1
(45) Date of Patent: Jan. 1, 2013

(54) MULTI-LAYER MICRO/NANOFLUID DEVICES WITH BIO-NANOVALVES

(75) Inventors: Hao Li, Austin, TX (US); Leonidas E. Ocola, Oswego, IL (US); Orlando H. Auciello, Bolingbrook, IL (US); Millicent A. Firestone, Elmhurst, IL (US)

(73) Assignee: UChicago Argonne, LLC, Argonne, IL (US)

( * ) Notice: Subject to any disclaimer, the term of this patent is extended or adjusted under 35 U.S.C. 154(b) by 977 days.

(21) Appl. No.: 12/391,486

(22) Filed: Feb. 24, 2009

Related U.S. Application Data

(60) Provisional application No. 61/032,509, filed on Feb. 29, 2008.

(51) Int. Cl.
*B01L 99/00* (2010.01)
(52) U.S. Cl. ........ 422/68.1; 422/502; 422/503; 422/537
(58) Field of Classification Search .................. 422/400, 422/401, 408, 412, 414, 417, 68.1, 82.05, 422/82.06, 82.07, 82.08, 82.09, 82.11, 82.01, 422/82.02, 82.03, 82.04, 500, 501, 502, 503, 422/537; 436/180, 174
See application file for complete search history.

(56) References Cited

U.S. PATENT DOCUMENTS

2006/0180469 A1* 8/2006 Han et al. ...................... 204/601
2007/0217957 A1* 9/2007 Flachsbart et al. ............ 422/101

OTHER PUBLICATIONS

Kocer, Armagan et al. "A light-actuated nanovalve derived from a channel protein." Science (2005) 309 755-758.*
Kuo, Tzu-Chi et al. "Hybrid three-dimensional nanofluidic/microfluidic devices using molecular gates." Sensors and Actuators A (2003) 102 223-233.*
Li, Hao et al. "Design and fabrication of a multilayer micro-/nanofluidic device with an electrically driven nanovalve." Journal of Vacuum Science and Technology A (2008) 26 752-756.*
Reiss, Brian et al. "Integration of biomolecules with inorganic ferroelectrics: A novel approach to nanoscale devices." MRS Proceedings (2006) 950 0950-D13-01.*
Reiss, Brian Dennis et al. "Ferroelectric-specific peptides as building blocks for bio-inorganic devices." MRS Proceedings (2006) 944 0944-AA02-08.*

* cited by examiner

*Primary Examiner* — Yelena G Gakh
*Assistant Examiner* — Christopher A Hixson
(74) *Attorney, Agent, or Firm* — Thomas W. Tolpin; Tolpin & Partners PC

(57) ABSTRACT

A user-friendly multi-layer micro/nanofluidic flow device and micro/nano fabrication process are provided for numerous uses. The multi-layer micro/nanofluidic flow device can comprise: a substrate, such as indium tin oxide coated glass (ITO glass); a conductive layer of ferroelectric material, preferably comprising a PZT layer of lead zirconate titanate (PZT) positioned on the substrate; electrodes connected to the conductive layer; a nanofluidics layer positioned on the conductive layer and defining nanochannels; a microfluidics layer positioned upon the nanofluidics layer and defining microchannels; and biomolecular nanovalves providing bio-nanovalves which are moveable from a closed position to an open position to control fluid flow at a nanoscale.

6 Claims, 22 Drawing Sheets

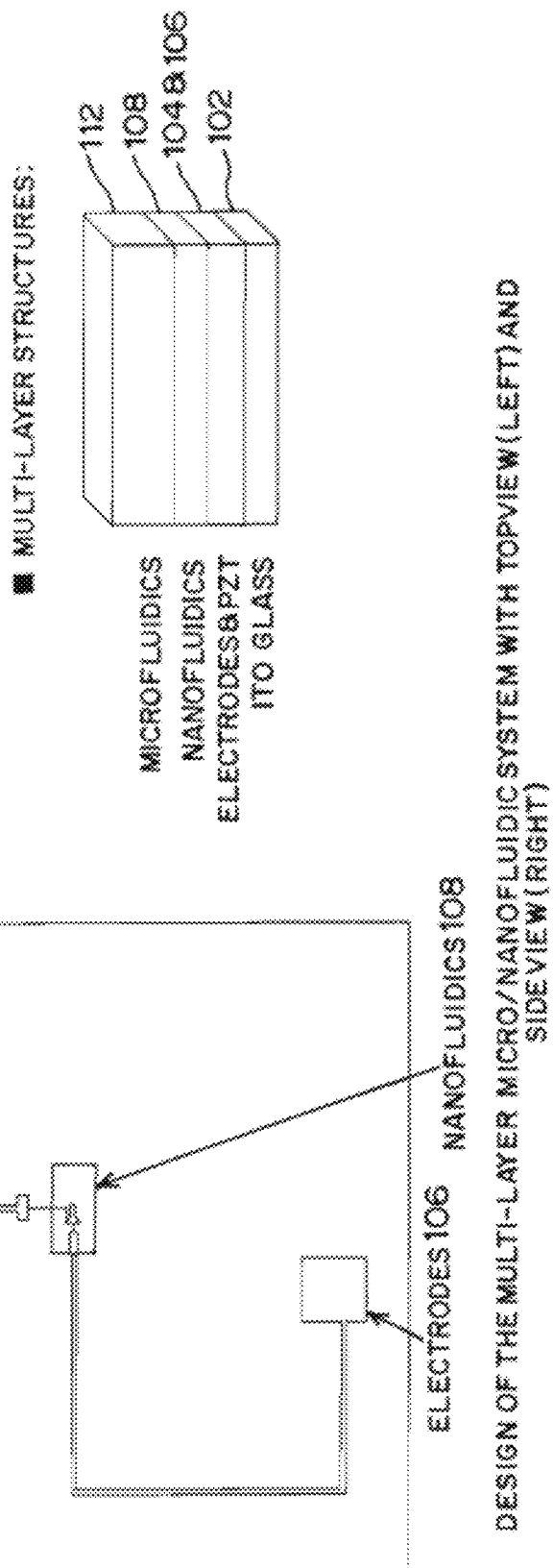
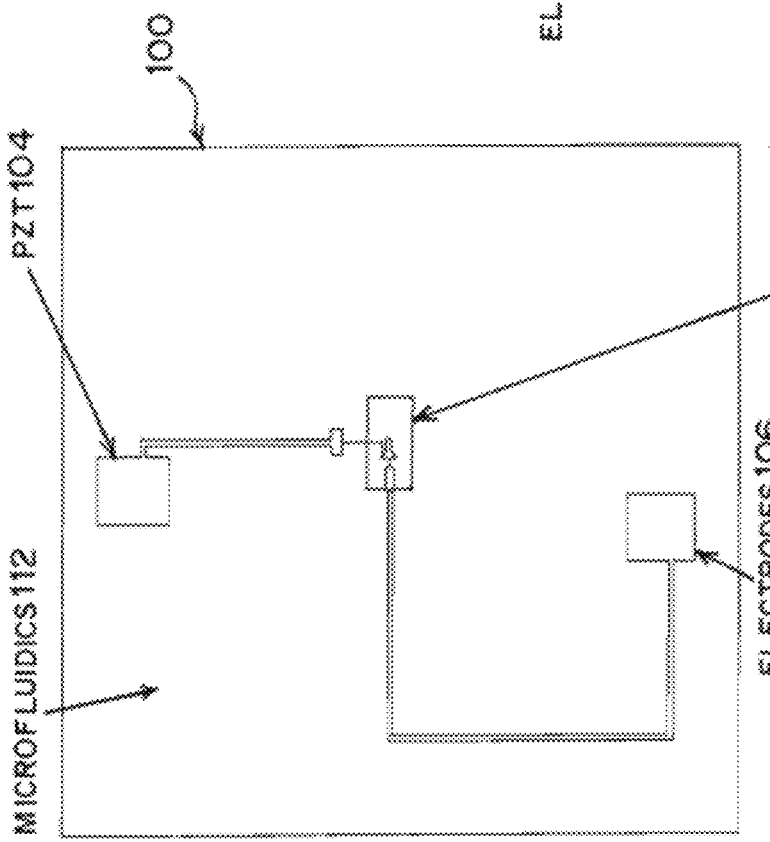

CONNECTION BETWEEN MICROFLUIDICS AND NANOFLUIDIC LAYERS
MICROFLUIDICS 112
200 μm x 25 μm
NANOFLUIDICS 108
RESERVOIR 118

NANOFLUIDIC CHANNELS
RESERVOIR 118
NANOFLUIDICS 108
200 nm x 200 nm

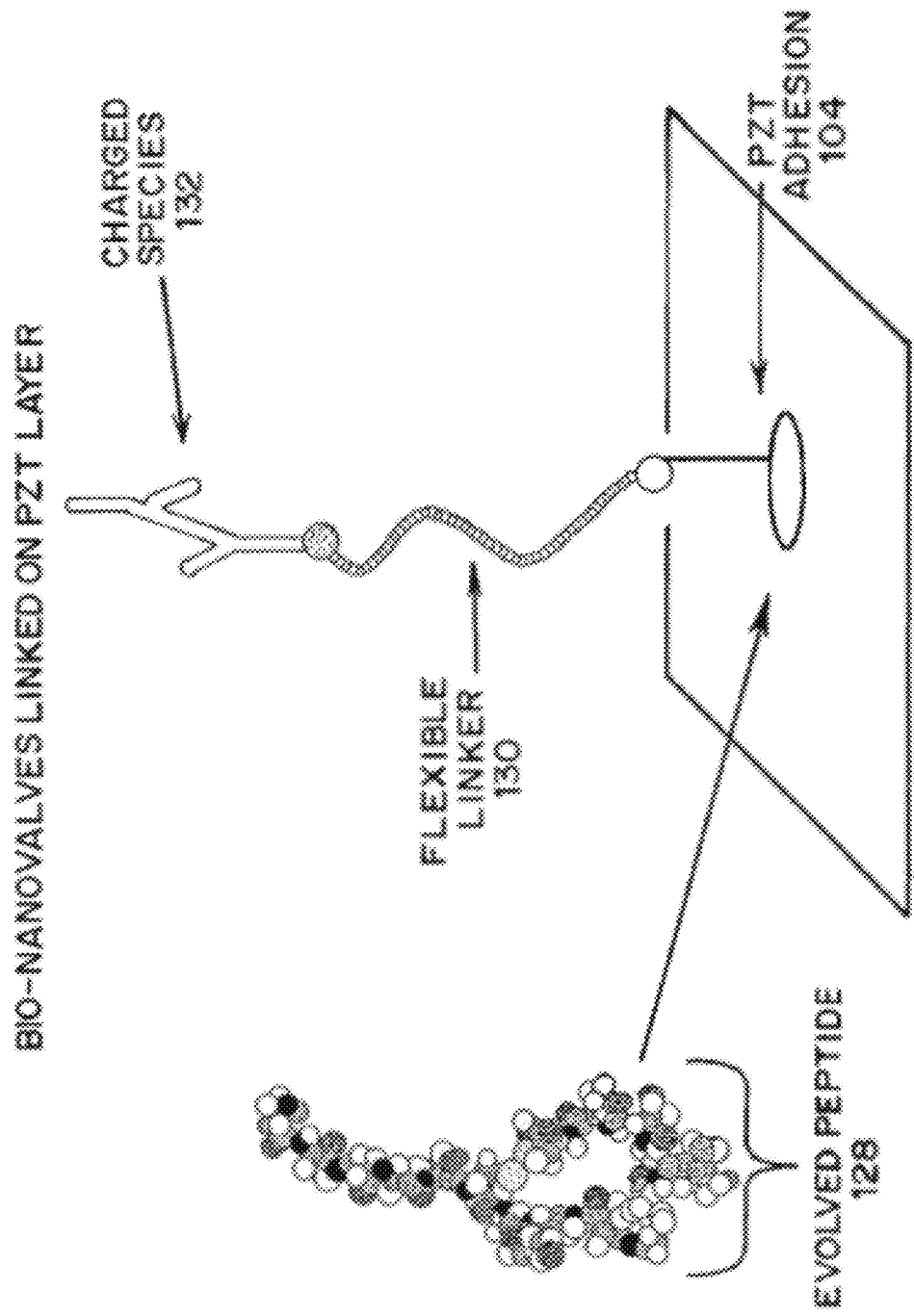

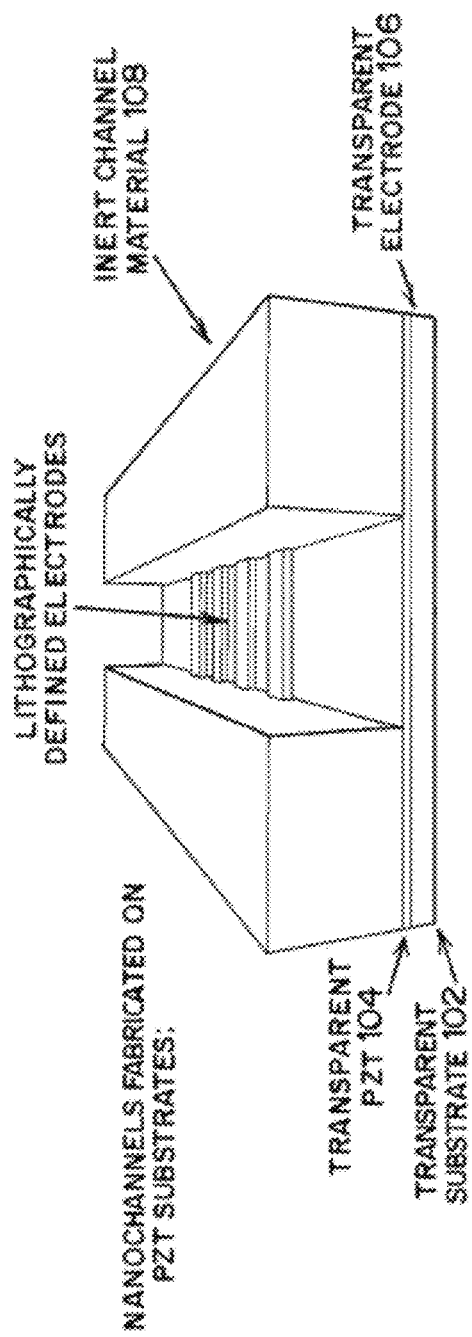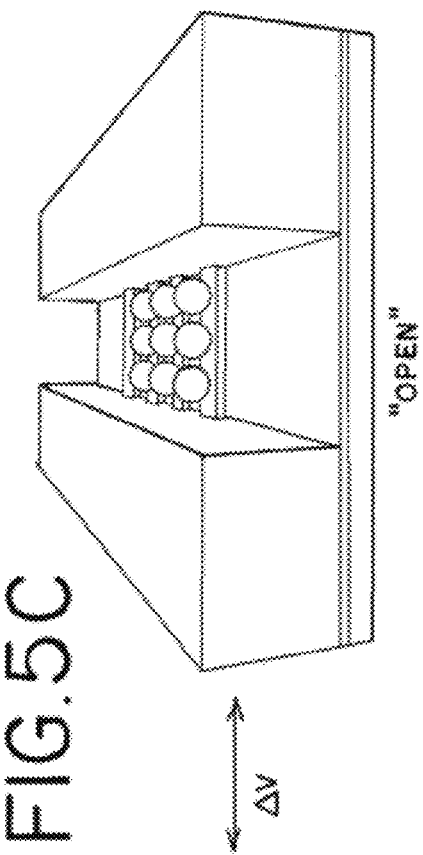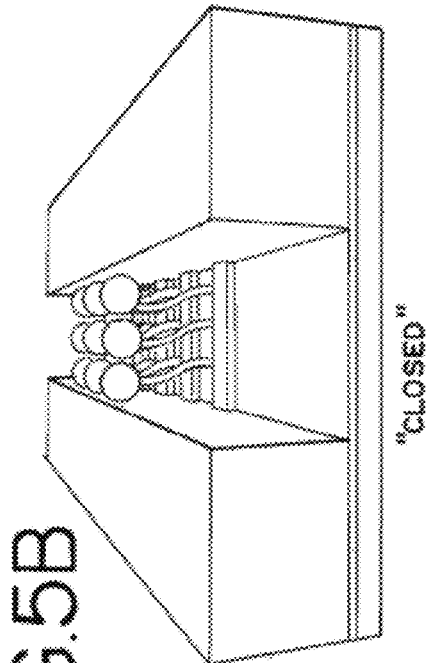

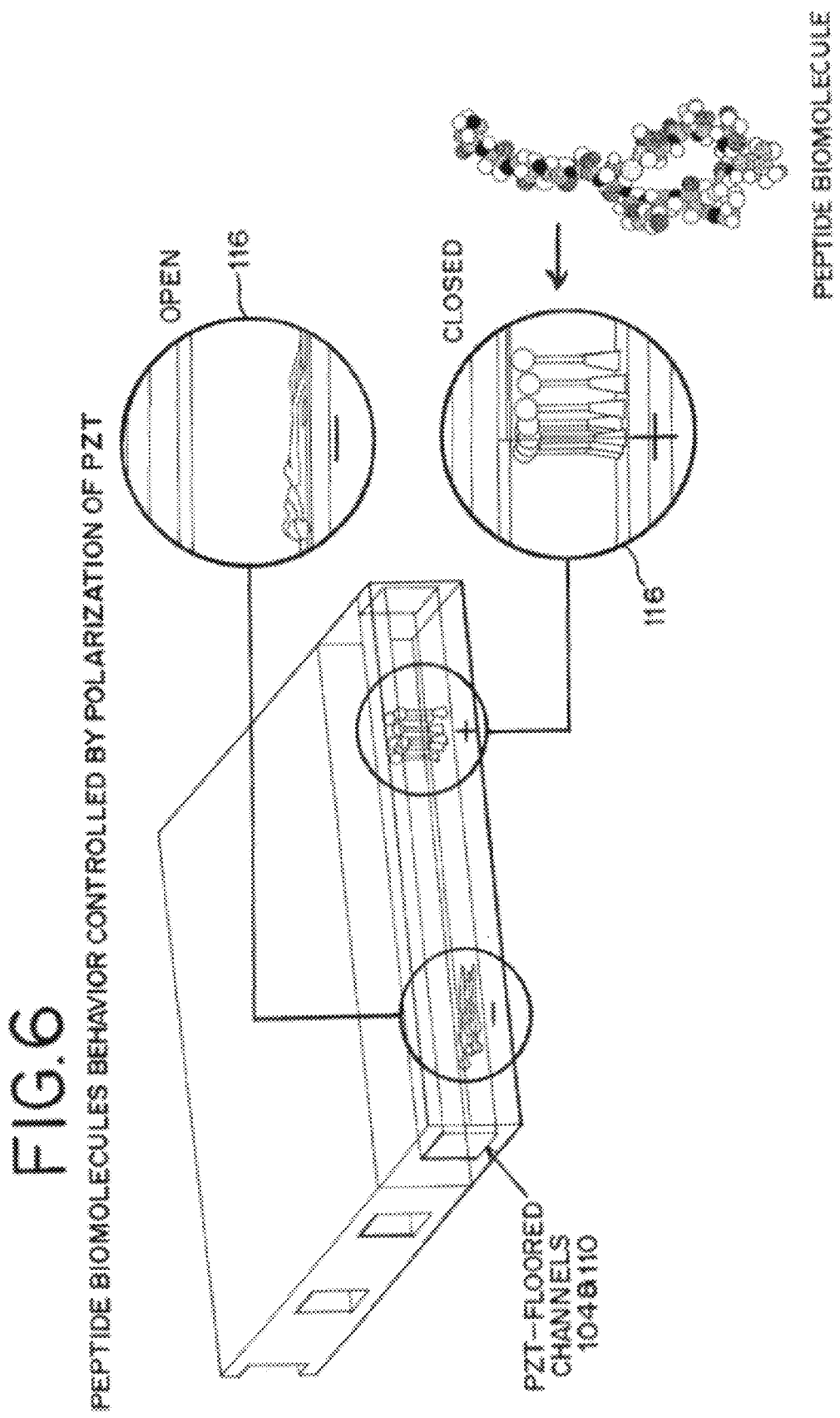

FLUORESCENCE OF PEPTIDES SHOWING SELECTIVE ATTACHMENT ON DIFFERENT MATERIALS

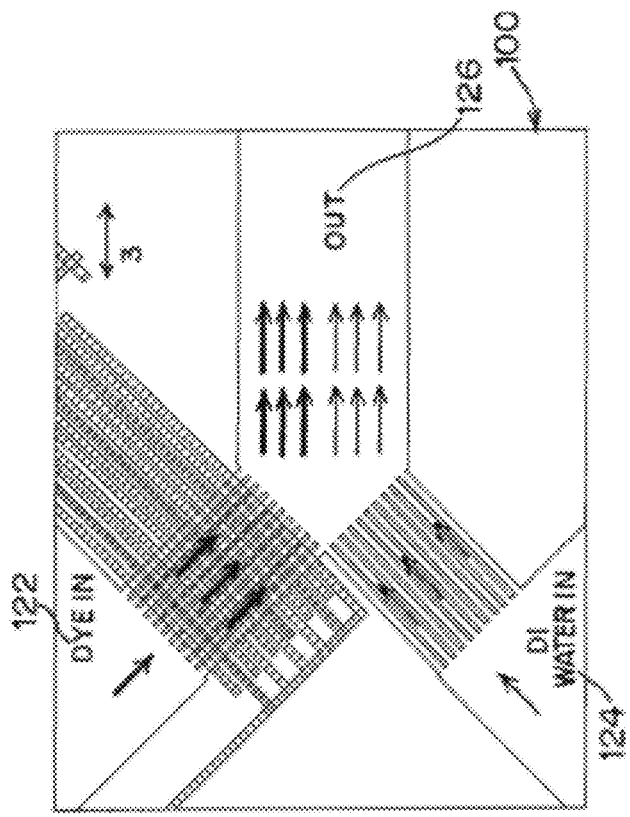
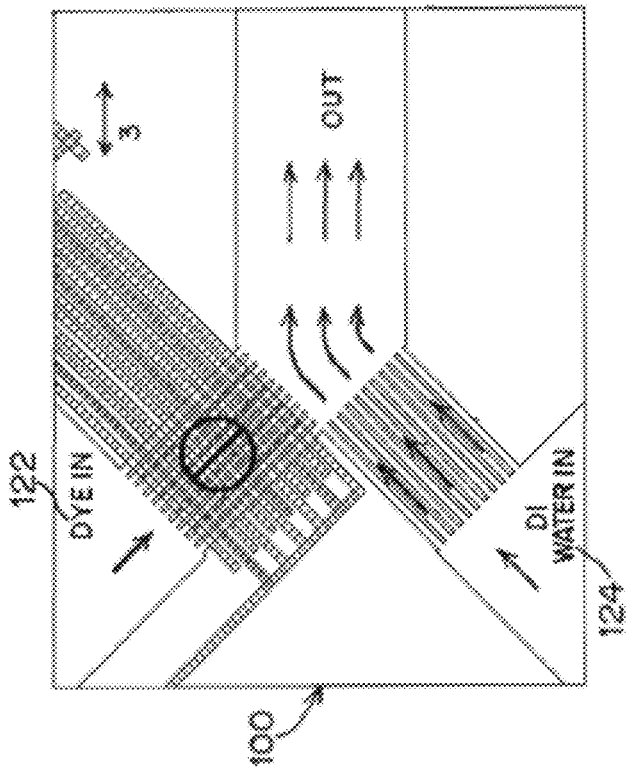

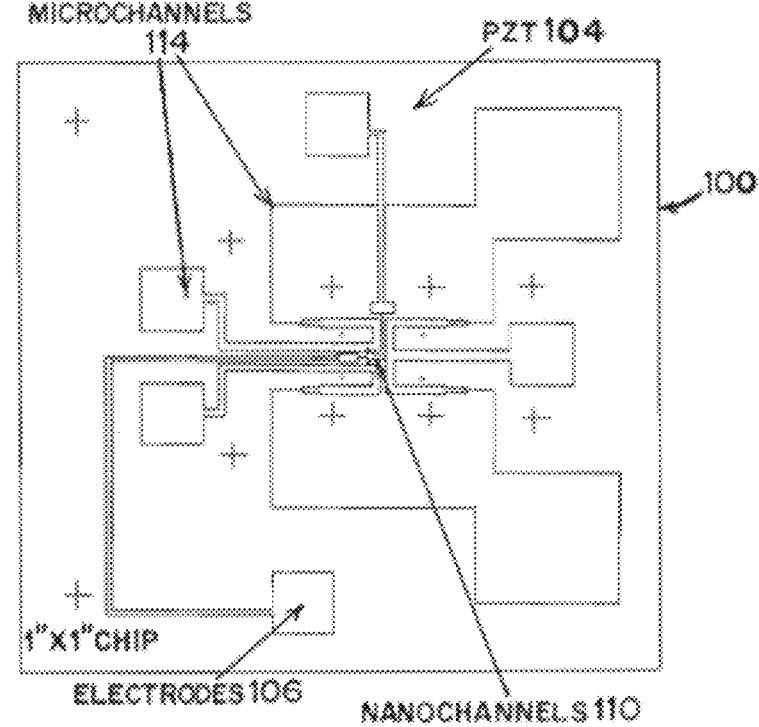
FIG. 9 OVERVIEW OF MICRO/NANOFLUIDIC DEVICE DESIGN
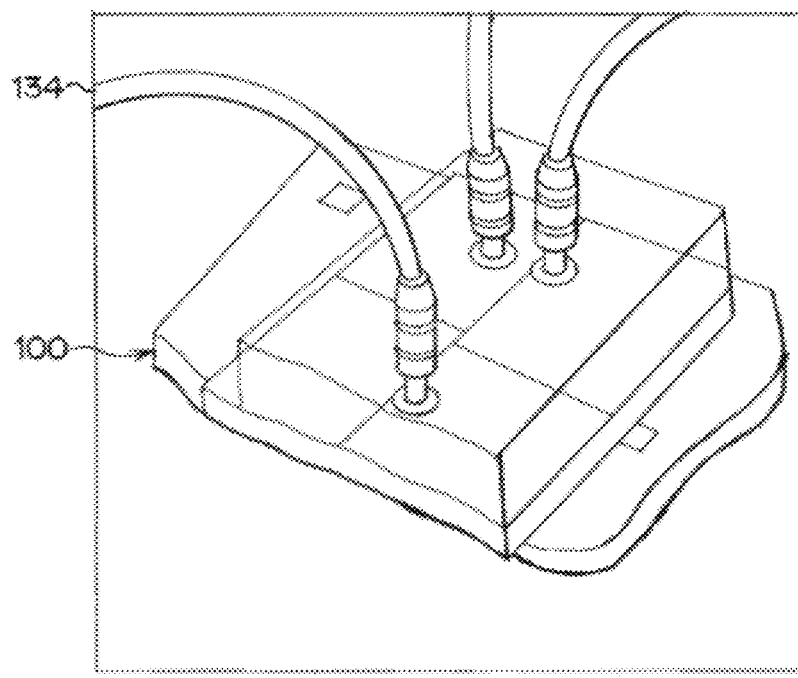
FIG. 10
DESIGN AND PHOTOGRAPHY OF MICRO/NANOFLUIDIC DEVICE
(b) PHOTOGRAPHY OF FABRICATED DEVICE

DESIGN OF MICROCHANNELS AND VIAS

DESIGN AND ALIGNMENT OF MICROCHANNELS AND VIAS

ALIGNMENT OF MICROCHANNELS AND VIAS IN FABRICATED DEVICE, MAGNIFICATION 5X

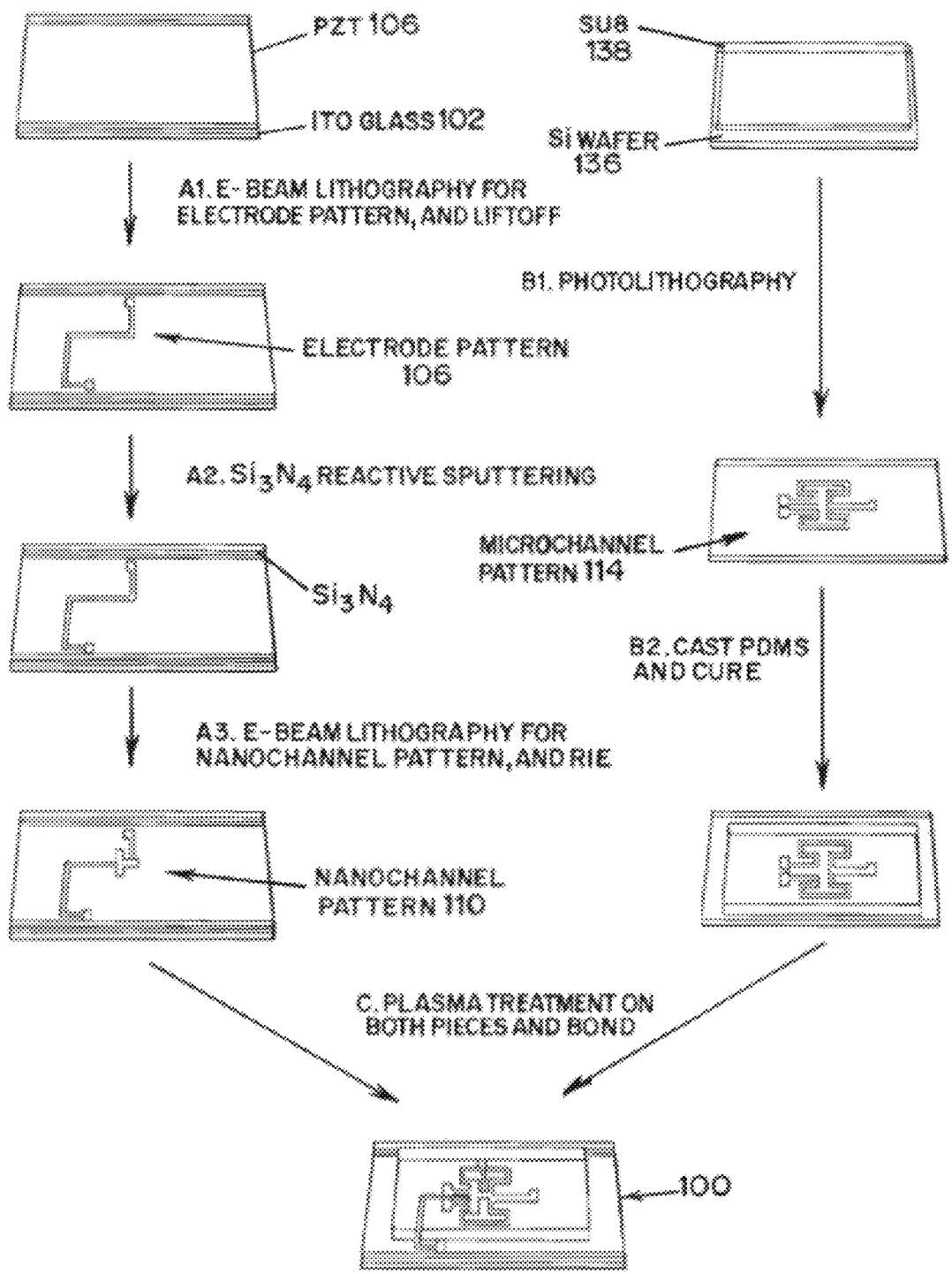

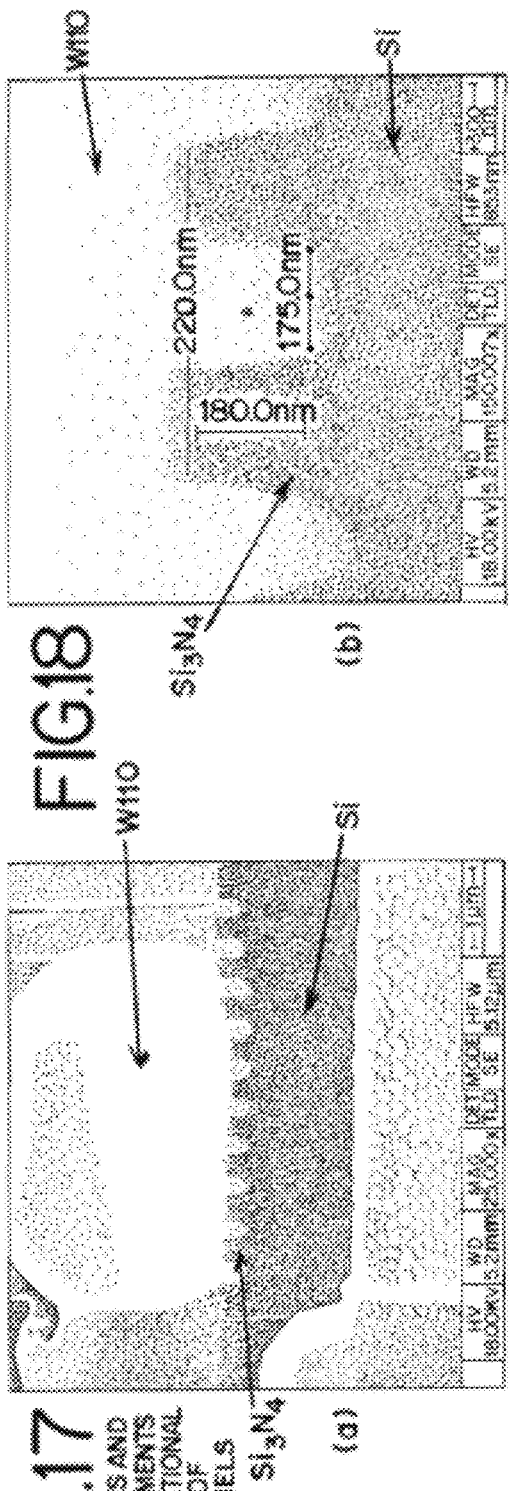
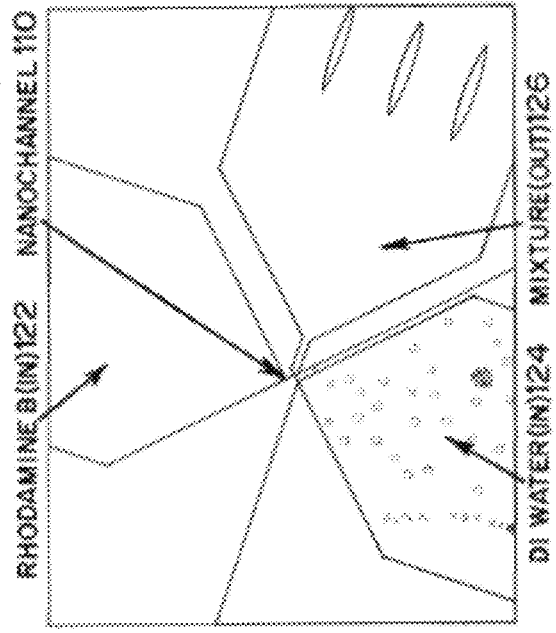
FIG. 17 (a) SEM IMAGES AND (b) MEASUREMENTS OF CROSS SECTIONAL DIMENSIONS OF NANOCHANNELS
FIG. 18
FIG. 19 PHOTO OF NANOMIX EXPERIMENT

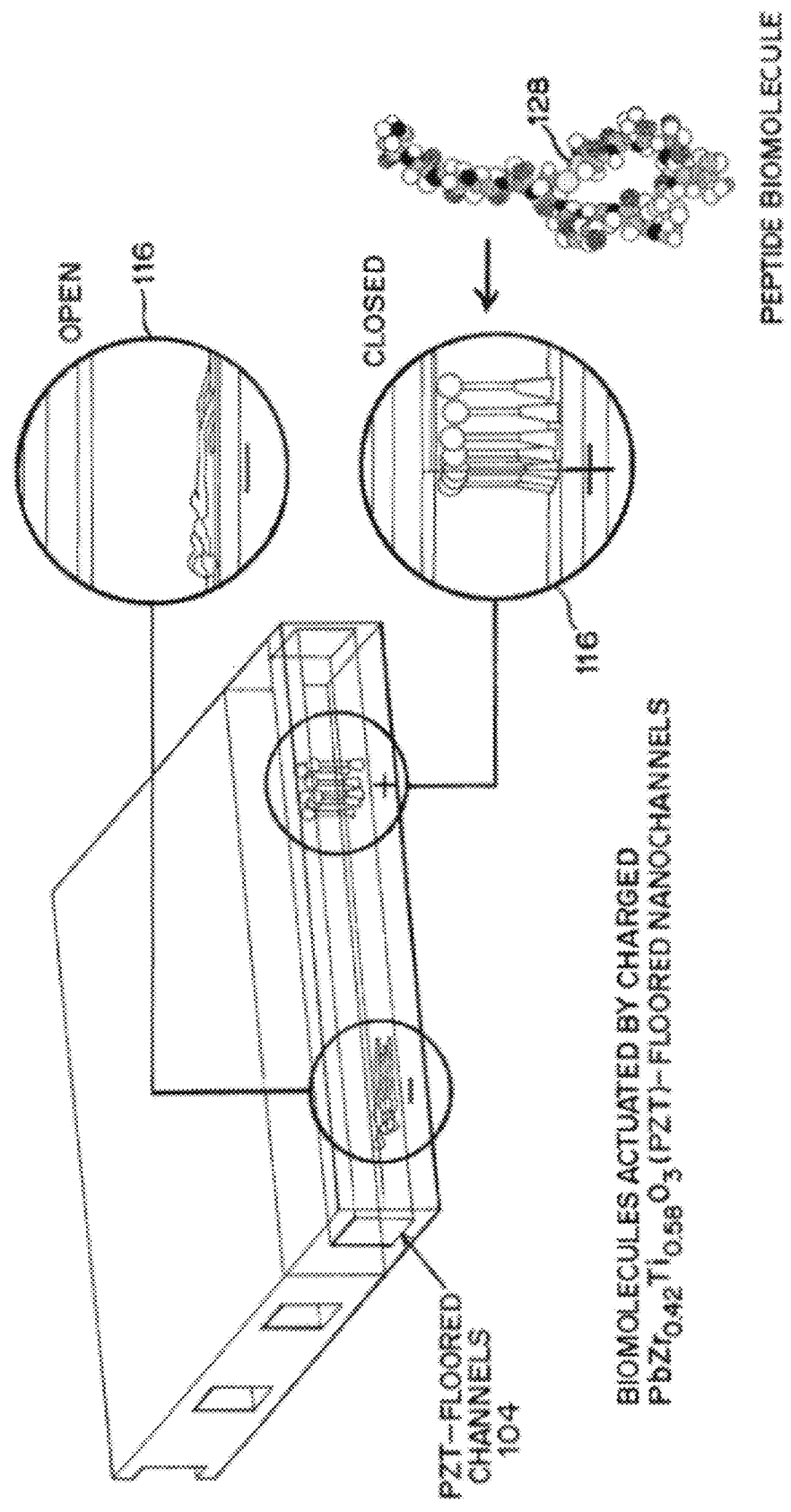

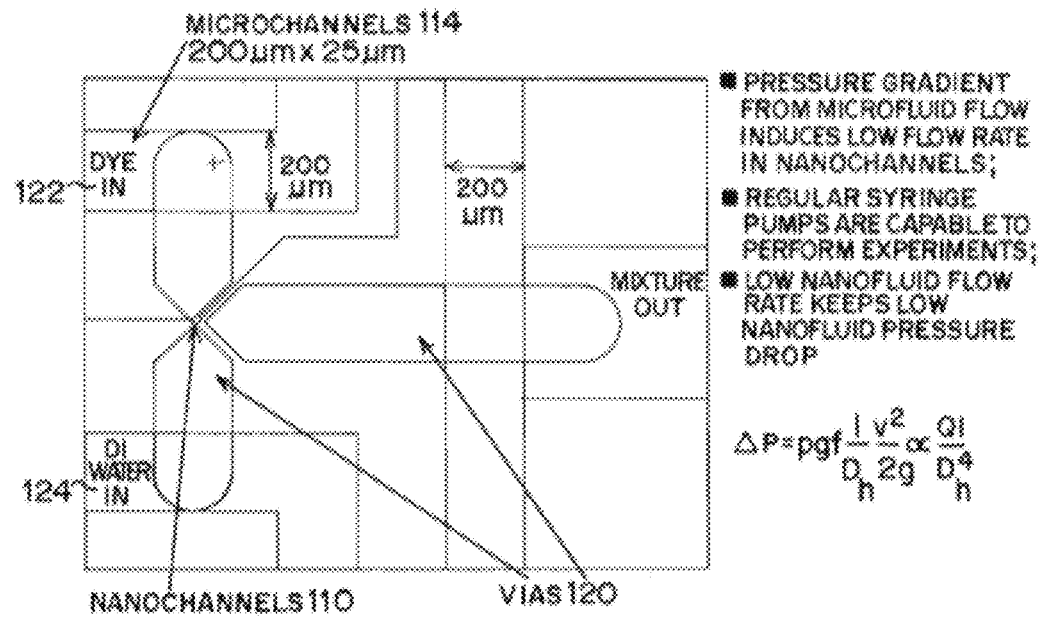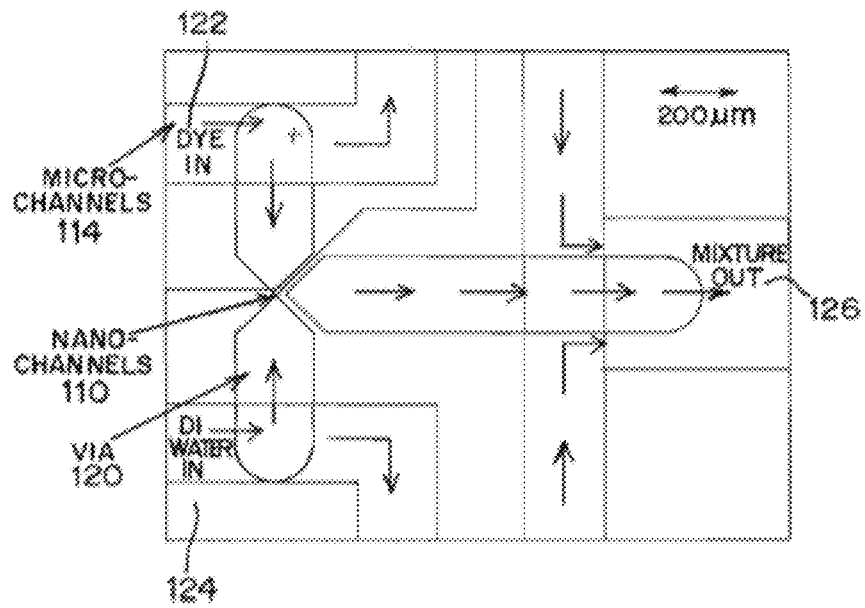

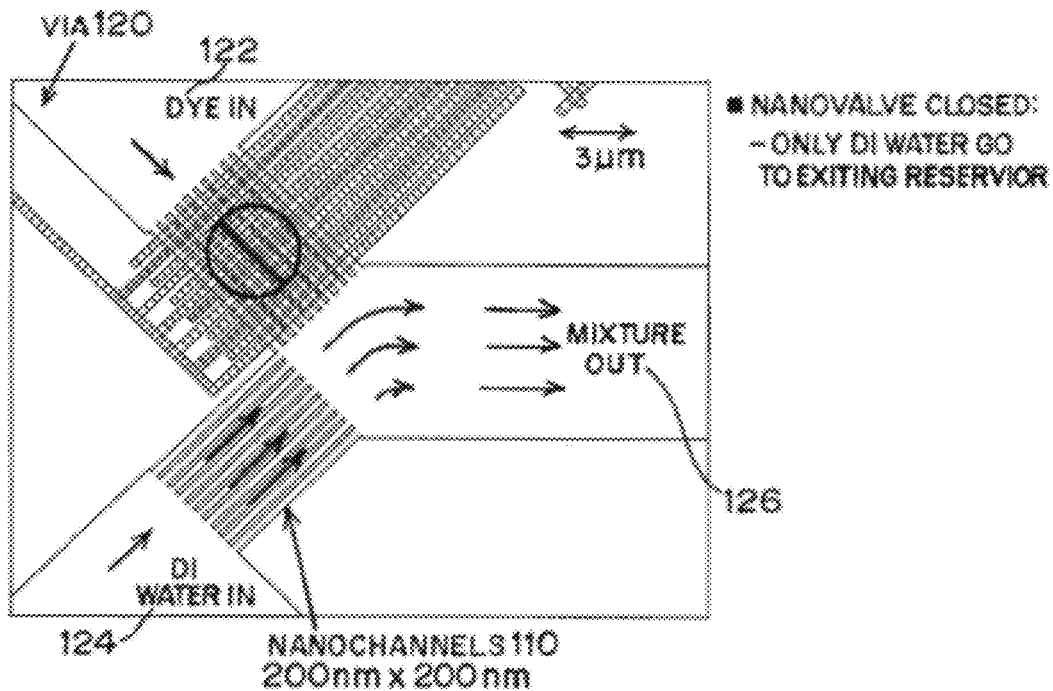
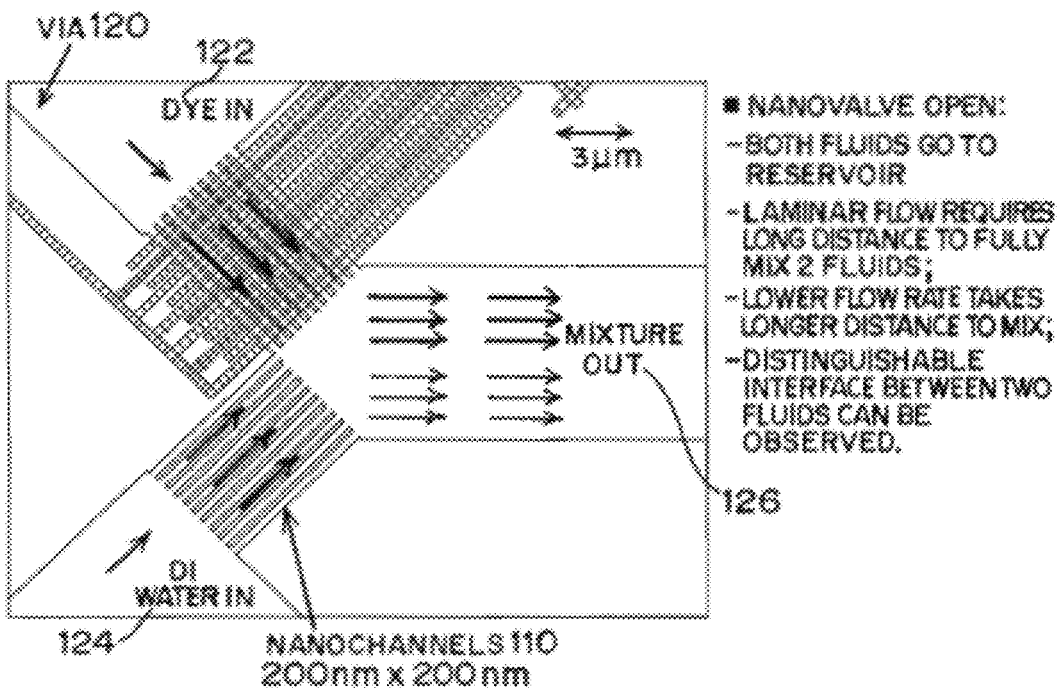

FIG. 29 RESULTS: ALIGNMENT COMPARISON
DESIGN
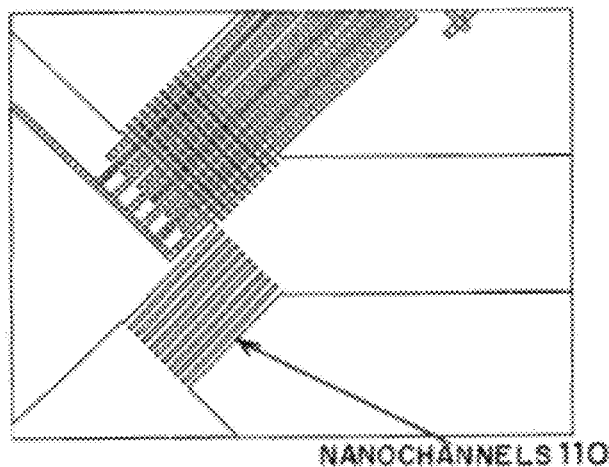
NANOCHANNELS 110
FIG. 30
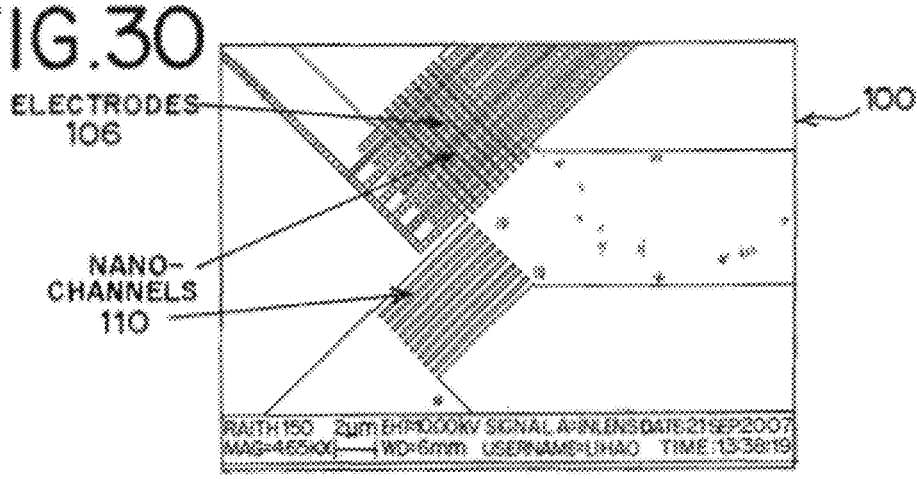
ELECTRODES 106
NANO-CHANNELS 110
100
FIG. 31 FABRICATION
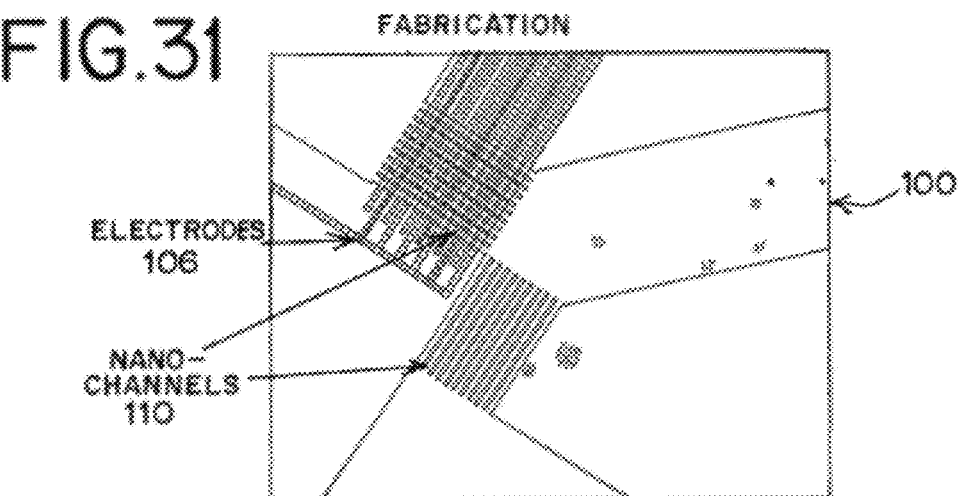
ELECTRODES 106
NANO-CHANNELS 110
100

DESIGN OF MICRO & NANOFLUIDICS

DESIGN OF MICRO & NANOFLUIDICS

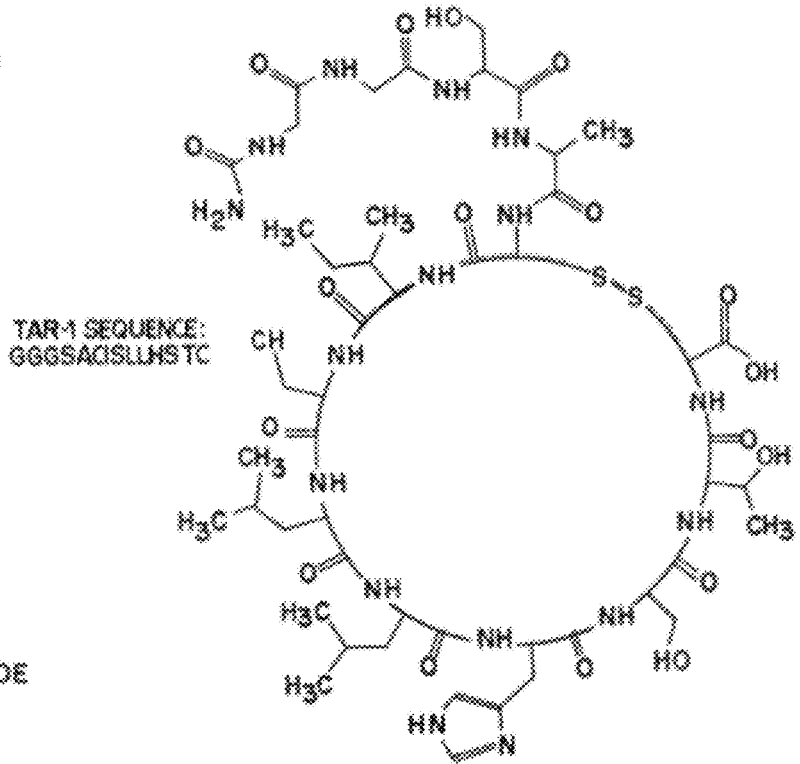
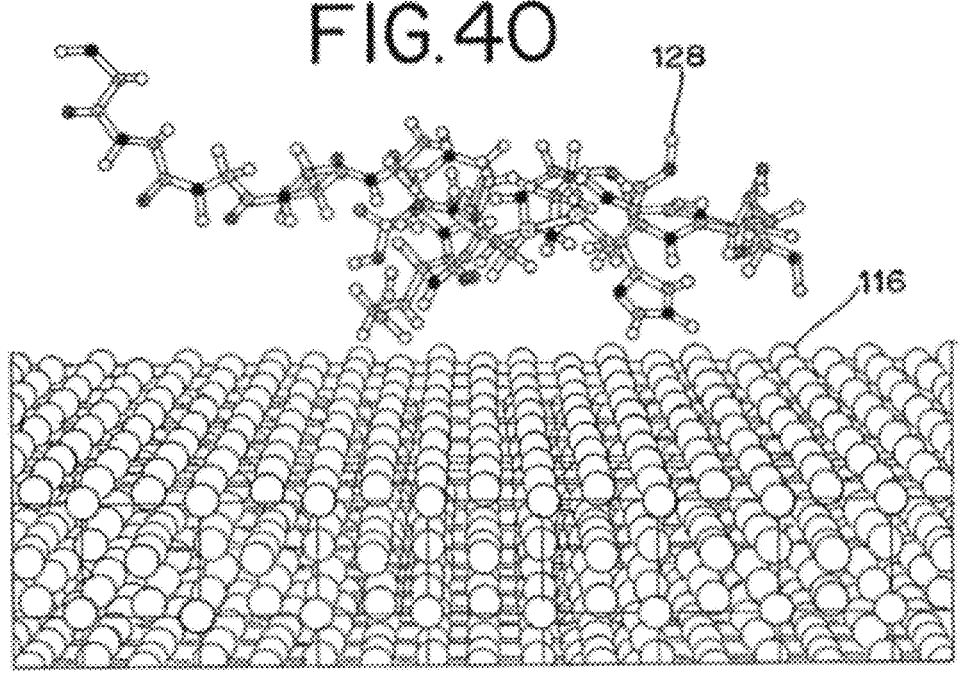
FIG.41 BIOMOLECULAR NANOVALVES
FIG.39 VIRUS
TAR-1 SEQUENCE: GGGSACISLLHSTC
EVOLVED PEPTIDE 128
FIG.40

MULTI-LAYER MICRO/NANOFLUID DEVICES WITH BIO-NANOVALVES

CROSS REFERENCES TO RELATED APPLICATION

This application is based upon U.S. Provisional Patent Application No. 61/032,509 filed Feb. 29, 2008.

STATEMENT REGARDING FEDERALLY SPONSORED RESEARCH OR DEVELOPMENT

The United States Government has rights in this invention pursuant to Contract No. LDRD 2006-269-NO and Contract No. DE-ACO2-06CH11357 between the U.S. Department of Energy (DOE) and UChicago Argonne, LLC representing Argonne National Laboratory.

BACKGROUND OF THE INVENTION

This invention relates to micro and nanofluidic devices and systems, and more particularly, to a multi-layer micro/nanofluidic flow device and micro/nano fabrication process.

Microfluidic devices and systems have attracted the attention of researchers due to high surface-to-volume ratio and improved performance in physical, chemical, biochemical, biological analysis and applications, especially enhancing the efficiency of chemical reaction, bio-analysis, and mass/momentum/heat transport in shorter times with higher controllable accuracy. Due to the advancement of the non-intrusive measurement techniques, e.g. microscopic particle image velocimetry (microPIV) and planar laser induced fluorescence (PLIF), the study on fluid behavior at microscale has become possible with proper laser wavelength, fluorescent particles, fluorescent dyes, exposure time, etc. However, these measurements techniques can not be applied on the study of fluidic flow at the nanoscale due to the limitation of the laser wavelength, fluorescent particles and pressure accumulation of the nanofluidic flow. Nanoscale fluid flow is useful but requires detectable fluid flow.

The fabrication of micro/nanofluidic devices has been advanced by the advancement of micro/nanofabrication techniques used for MEMS/NEMS manufacture. For example, electron beam lithography, photolithography, reactive ion etching, sputtering, liftoff, wafer bonding, and the like, have been used to fabricate micro/nanoscale features for lab-on-a-chips. Furthermore, due to the advancement of the non-intrusive measurement techniques, e.g. microscopic particle image velocimetry (microPIV) and planar laser induced fluorescence (PLIF), the study on fluid behavior at microscale, has become possible provided proper laser wavelength, fluorescent particles, fluorescent dyes, exposure time, etc. However, these measurement techniques can not be applied on the study of fluidic flow at the nanoscale due to the limitations of the laser wavelength, fluorescent particles, and pressure accumulation of nanofluidic flow.

It is, therefore, desirable to provide an improved multi-layer micro/nanofluidic flow device and micro/nano fabrication process, which overcomes most, if not all of the preceding problems and disadvantages.

BRIEF SUMMARY OF THE INVENTION

An improved multi-layer micro/nanofluidic flow device and micro/nano fabrication process are provided. Advantageously, the improved multi-layer micro/nanofluidic flow device and micro/nano fabrication process are economical, effective, and efficient. The improved multi-layer micro/nanofluidic flow device and micro/nano fabrication process produced unexpected surprisingly good results.

In order to enable the fluidic research into nanoscale size, it is necessary to provide a feasible design of nanofluidic device and corresponding control method. The present invention meets these requirements and other needs. Advantageously, the present invention comprises a multi-layer microfluidic system and nanofluidic system (a multi-layer microfluidic and nanofluidic system) with additional substrate layers, e.g. ferroelectric material and an electrode for nanofluidic control. The inventive multi-layer microfluidic and nanofluidic system can provide a way to overcome the considerable pressure in the fluid flow at nanoscale by using microfluidic flow as the driving force for nanofluidic flow. The invention can also includes control methods for nanofluidic channels comprising bionanovalves triggered by the polarization of a ferroelectric material layer. In one form, the multi-layer micro and nanofluidic systems are connected by vias.

One of the many advantages of the present invention is to achieve nanofluidic flow using microfluidic flow. Given high pressure loss in nanoscale fluidic flow, the mass flow rate can be extremely limited by the strength of the inventive device. However, the invention, using microfluid flow conditions, can easily achieve the nanofluid flow rate using regular driving force and relatively high mass flow rate provided by a syringe pump.

In the preferred form, the inventive multi-layer micro/nanofluidic flow device, comprises: a substrate, such as indium tin oxide coated glass (ITO glass); a conductive layer of ferroelectric material, preferably comprising a PZT layer of lead zirconate titanate ($Pb(Zr_xTi_{1-x})O_3$) (PZT) positioned on the substrate; electrodes connected to the conductive layer (e.g. PZT); a nanofluidics layer positioned on the conductive layer (e.g. PZT layer) and defining nanochannels; a microfluidics layer positioned upon the nanofluidics layer and defining microchannels; and biomolecular nanovalves providing bio-nanovalves which are operatively associated with the nanochannels and moveable from a closed position to an open position to control fluid flow at a nanoscale. Desirably, the bio-nanovalves are activated by polarization of the conductive layer of ferroelectric material (e.g. PZT layer). The multi-layer micro/nanofluidic flow device can have reservoirs or vias, as well as a dye inlet for inflow (ingress) of a dye comprising a fluid; a water inlet for inflow (ingress) of water, preferably distilled (DI) water; and a mixture outlet for outflow (egress) of the dye and water.

The $PbZr_{0.42}Ti_{0.58}O_3$ (PZT) layer polarization can be controlled by the charge of top electrodes and bottom indium tin oxide (ITO) electrode layer where the PZT and lanthanum nickelate ($LaNiO_3$) (LNO) are sandwiched. By controlling the polarization of the PZT layer, selectively attached peptide biomolecules tether and can behave as nanovalves to open/close the nanofluid channel.

The present invention generally provides the way to overcome the considerable pressure in the fluid flow at nanoscales by using microfluidic flow as the driving force for nanofluidic flow.

The present invention also includes control methods for nanofluidic channels, which comprises bio-nanovalves triggered by the polarization of a ferroelectric material layer.

In a related aspect, the present invention further provides a special device for nanofluidic flow study. Small fluid flow rate at nanoscales can be achieved by using microfluidic pressure drop as the driving force at nanoscales and reach low fluid flow rates, such as $10^{-5}$ μl/min.

In another aspect, the present invention provides a nanofluidic device controlled by bionanovalves, which can be used for release-on-demand drug delivery systems.

In a further aspect, the present invention of the nanofluidic device with bio-nanovalves can useful to concentrate bio-elements. The bio-elements can be accumulated within the nanochannels when the bio-nanovalves are closed. When the bio-nanovalves are open, the highly concentrated elements can be driven to a sample container under the pressure of microfluidic flow.

In another related aspect, the present invention of the nanofluidic device with bionanovalves can provide mixing of two different fluids in controlled mixing ratio by variable on/off period of the bio-valves.

A preferred micro/nano fabrication process for fabricating a multi-layer micro/nanofluidic flow device comprises the steps of: forming a conductive layer on a substrate; forming an electrode pattern; forming a nanofluidics layer with a nanochannel pattern to define nanochannels; forming a microfluidics layer with a microchannel pattern to define microchannels; and assembling the microfluidics layer on the nanofluidics layer.

In the illustrative embodiment, the conductive layer on a substrate is formed by synthesizing a thin film of ferroelectric material comprising $PbZr_{0.42}Ti_{0.58}O_3$ (PZT) with sol-gel on a conductive indium tin oxide (ITO) layer on glass. The electrode pattern is formed with electron beam lithography and/or sputtering. The nanofluidics layer layers with a nanochannel pattern are formed by reactive sputtering a thin film of silicon nitride ($Si_3N_4$) on the surface of PZT and electrodes and spin-coating the substrate and exposing the substrate to an electron beam to form nanochannels and vias. The microfluidics layer with a microchannel pattern are formed by photolithography of photoresist partially cured epoxy resin (SU8) molded on a silicon (Si) wafer and the microchannels comprise polydimethylsiloxane (PDMS). Assembly of the microfluidics layer on the nanofluidics layer can comprise: removing polydimethylsiloxane (PDMS) from a mold; trimming the PDMS with microchannels; punching access holes in the PDMS; coating flexible tubing with a room temperature vulcanizing (RTV) sealant; and inserting the coated flexible tubing into the access holes. The microfluidics layer on the nanofluidics layer can be plasma treated with plasma deposition curing equipment. After plasma treatment, the plasma treated microfluidics layer and nanofluidics layer can be post treated in a convection oven for substantial complete adhesion at a PDMS/$Si_3N_4$ interface.

The multi-layer micro/nanofluidic flow device can be used in at least one or more of the following applications: fluidic research at a nanoscale, control of fluids, bio-chemical reactions, heat transfer, controlling nanofluidics, sensing, gating, concentrating nanoelements, mixing, mixing nanofluidic materials, sorting, concentrating, studying fluid flow and heat transfer at a nanoscale, studying micro/nanofluidics, nano-chemical-reactions, AC/DC control, as a protein sorter and concentrator, biological sensing, fluidic control, drug delivery, nanomixing, lab-on-a-chip, and bio-medical applications A more detailed explanation of the invention is provided in the following detailed descriptions and appended claims taken in conjunction with the accompanying drawings.

BRIEF DESCRIPTION OF THE DRAWINGS

FIG. 1A is a top view of a multi-layer micro/nanofluidic flow device in accordance with principles of the present invention.

FIG. 1B is a side view of the multi-layer micro/nanofluidic flow device.

FIG. 4 is a diagrammatic view of bio-nanovalves linked on a PZT layer and illustrating an evolved peptide, flexible linker, and charged species.

FIG. 5A is a perspective diagrammatic view of nanochannels fabricated on PZT substrates with lithographically defined electrodes, an inert channel material on transparent substrate and a transparent electrode in bio (biomolecular) nanovalves.

FIG. 5B is a perspective diagrammatic view of the bio-nanovalves in a closed position.

FIG. 5C is a perspective diagrammatic view of the bio-nanovalves in an open position.

FIG. 6 illustrates peptide biomolecular behavior controlled by polarization of PZT.

FIGS. 8A and 8B illustrate the function of the bio-nanovalves with the mixing of distilled (DI) water and fluorescent dye.

FIG. 9 is a top view of a multi-layered micro/nanofluidic flow device in accordance with principles of the present invention.

FIG. 10 is a photograph of a fabricated multi-layered micro/nanofluidic flow device.

FIG. 16 is a diagrammatic view of a micro/nano fabrication process in accordance with principles of the present invention.

FIG. 17 illustrates SEM images of the nanochannels.

FIG. 18 shows measurements of the cross-sectional dimensions of the nanochannels.

FIG. 19 illustrates a nanomix experiment showing the inflow of both Rhodmaine B and distilled (DI) water and the outflow of their mixture through the nanochannels of the multi-layered micro/nanofluidic flow device.

FIG. 20 is a perspective view of the multi-layer micro/nanofluidic flow device with PZT-floored channels and open and closed bio-nanovalves illustrating the purposes and working principles of biomolecules actuated by the charged PZT-floored nanochannels with input of peptide biomolecules.

FIG. 23 is a top view of the multi-layer micro/nanofluidic flow device illustrating the microchannels, nanochannels, and vias.

FIG. 24 illustrates flow patterns in a multi-layer micro/nanofluidic flow device.

FIG. 27 shows the flow patterns in the multi-layer micro/nanofluidic flow device with the nanovalve closed and illustrating the dye inlet, a distilled (DI) water inlet, the mixture outlet, vias and nanochannels.

FIG. 28 shows the flow patterns in the multi-layer micro/nanofluidic flow device with the nanovalve open and illustrating the dye inlet, a distilled (DI) water inlet, the mixture outlet, vias and nanochannels.

FIG. 29 is a top view of the nanochannels.

FIG. 30 illustrates measurements and alignment of electrodes and nanochannels.

FIG. 31 is a top view of the fabrication of electrodes and nanochannels.

FIG. 39 illustrates a virus comprising an evolved peptide.

FIG. 40 is a perspective view of biomolecular (bio) nanovalves.

FIG. 41 is a chemical structure of a TAR-1 Sequence: GGGSACISLLHSTC.

DETAILED DESCRIPTION OF THE INVENTION

Figure 2:
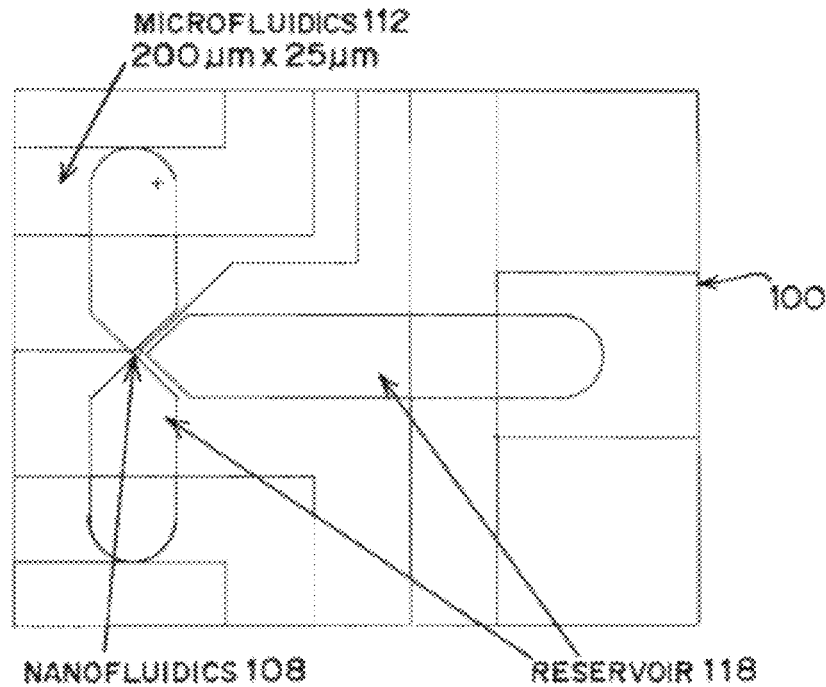
FIG. 2 is a top view of the reservoir and connection between the microfluidics and nanofluidics layers of the multi-layer micro/nanofluidic flow device.

The following is a detailed description and explanation of the preferred embodiments of the invention and best modes for practicing the invention.

As shown in the drawings, a novel, multi-layer micro/nanofluidic flow device 100 (FIGS. 1A and 1B) is provided, which is also referred to as a multi-layered nanofluidic flow device. The multi-layer micro/nanofluidic flow device can comprise a substrate 102 made of indium tin oxide coated glass (ITO glass) upon which is stacked and positioned a layer 104 of lead zirconate titanate ($Pb(Zr_xTi_{1-x})O_3$) (PZT). The multi-layer micro/nanofluidic flow device contains electrodes 106 connected to the PZT. A nanofluidics layer (nanofluidics) 108 with nanochannels 110 is stacked and positioned upon the PZT layer. A microfluidics layer (microfluidics) 112 with microchannels 114 is stacked and positioned upon the nanofluidics layer. Bio-nanovalves (biomolecular nanovalves) 116 in the nanochannels are activated by polarization of the PZT layer. The bio-nanovalves open and close the fluid flow passage that permits the control and measurement of fluid flow at a nanoscale. The multi-layer micro/nanofluidic flow device can have reservoirs 118 (FIG. 2) and/or vias 120 (FIG. 23), as well as a dye inlet 122 (FIG. 19), distilled (DI) water inlet 124, and mixture outlet 126. The multi-layer micro/nanofluidic flow device uses the pressure gradient from microfluid flow to induce low flow rates in the nanochannels. Low nanofluid flow rate keeps nanofluid pressure drop low. Desirably, low nanofluidic pressure drop is preferred to assure the physical integrity of the multi-layer micro/nanofluidic flow device.

The manufacture of the inventive device and system invention can involve one or more interdisciplinary research results and techniques, e.g. electron beam lithography, photolithography, reactive ion etching, peptides preparation, micro/nanofluid channel design, sol gel, preparation of peptides, etc.

Generally, the present invention provides multi-layer micro and nano fluidic systems connected by vias, FIG. 1. On the substrate of indium tin oxide coated glass (ITO glass), a layer of lead zirconium titanate (PZT), e.g. about 90 nm, is synthesized via a sol gel method for polarization purposes. Palladium (Pd) electrodes are fabricated on the PZT layer, using electron beam (ebeam)-lithography, sputtering, and/or liftoff. The Pd layer can be about 200 nm (W)×30 nm (H).

Figure 3:
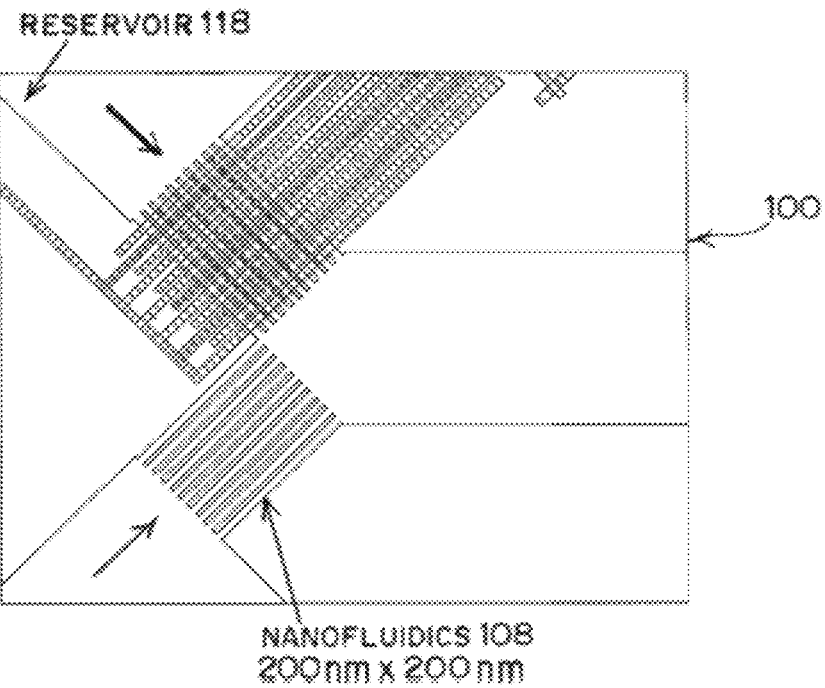
FIG. 3 is a top view of the nanofluidic channels and reservoir in the multi-layer micro/nanofluidic flow device.
Figure 7A:
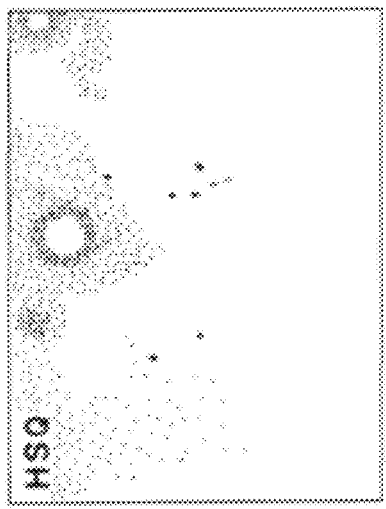
FIGS. 7A, 7B, 7C, and 7D illustrate the fluorescence of peptides showing selective attachment on different materials.
Figure 7C:
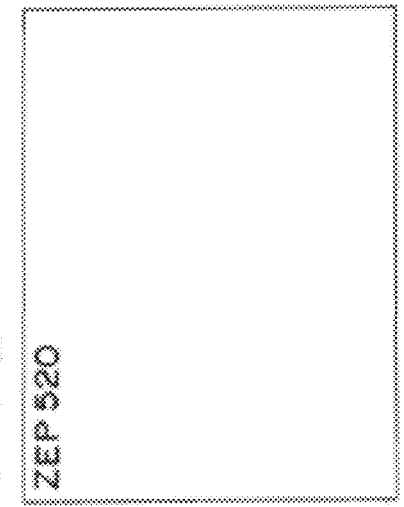
Figure 7B:
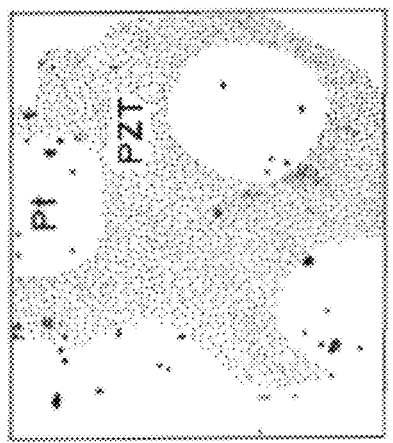
Figure 7D:
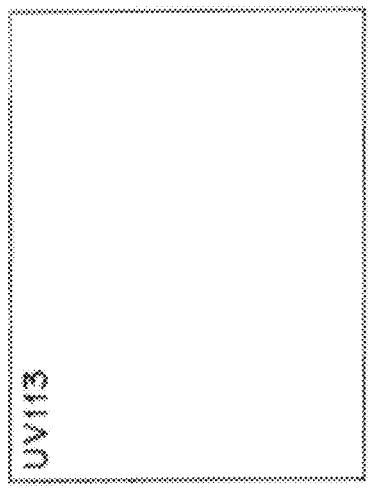

Thin layer of $SiN_4$, 200 nm, can be sputtered on the PZT and palladium (Pd) layers. A pattern of nanochannels can be transferred on the nitride layer using ebeam lithography and reactive ion etching, such as shown in FIG. 2 and FIG. 3. Due to the low selectivity of silicon nitride ($Si_3N_4$) to silicon (Si), a thick layer of positive electron-beam resist ZEP can be used. The nanochannels can be 200 nm (W)×200 nm (H) with spacing distance of 200 nm.

A mold of microfluidic channels can be made using photolithography of partially cured epoxy resin (SU8). After the mold is completed, polydimethylsiloxane (PDMS) can be spun cast on the pattern and cured at 60° C. The structure of microfluidic channels can include straight channels of width 200 μm and 25 μm with nozzles and diffusers to provide driving pressure for nanoscale fluid flow.

Fluids driven by a syringe pump can pass through the microchannels from the inlets (left side of top view in FIG. 1) and mix at the exit (right side of top view in FIG. 1). By the pressure difference between the two upstream vias and the downstream via, small amount of both fluids flows through the nanochannels and mixes at the exit via with microfluidic flow, as shown in FIGS. 2 and 3.

One of the many advantages of the present invention is to achieve nanofluidic flow using microfluidic flow. Since the high pressure loss in nanoscale fluidic flow, the mass flow rate can be extremely limited by the strength of a conventional device. For example, to reduce the channel half, the flow rate has to be reduced to 1/16 to prevent damage of a conventional device assuming laminar flow, which raises challenges for the flow rate magnitude and accuracy. This inventive device and system, using microfluid, can readily achieve the nanofluid flow rate using regular driving force and relatively high mass flow rate, such as provided by a syringe pump.

Peptide can provide selective attachment on a PZT layer whose polarization can be controlled by the charge of electrodes and indium tin oxide (ITO) layers where the PZT and lanthanum nickelate ($LaNiO_3$) (LNO) is sandwiched. By controlling the polarization of the lead zirconate titanate ($Pb(Zr_xTi_{1-x})O_3$) (PZT) layer, biomolecules are tetherered on peptides 128 with a flexible linker 130 connected to a charged species 132, as shown in FIG. 4, and behave and function as nanovalves to open or close the nanofluid channel, as shown in FIGS. 5 and 6. The peptide can selectively attach to the PZT layer with strong adhesion to hold bio-molecules on the PZT surface, as shown in FIG. 7.

The present invention comprises a multi-layer microfluidic system and a nanofluidic system, with additional substrate layers, e.g. a ferroelectric material and an electrode layer for nanofluidic control. Fabricated elements, e.g. vias, walls, can be manufactured into the surfaces in microfluidic and nanofluidic layers. These fabricated elements can define the various microfluidic and nanofluidic aspects and structures. The electrodes can be used to create surface charges on the ferroelectric substrate that is located at the bottom of the nanofluidic tunnels. In this manner the fluid flow through the tunnel is affected.

To illustrate the function of the design and synthesis, deionized water can be driven through one of the inlets of the inventive device and fluorescent dye can be driven through the other inlet of the inventive device. By observing the variation of mixing behavior in nanochannels when electrodes are charged, the function of the bionanovalves can be demonstrated, as shown FIGS. 8A and 8B.

Applications for the inventive multi-layer microfluidic system and a nanofluidic system include sensing, gating, concentrating, and general nanofluid control. The multi-layer microfluidic system and a nanofluidic system can also be enhanced by functionalizing the ferroelectric substrate with charged entities such as biomolecules, nanoparticles or nanowires to accentuate the effect of the surface charges to the nanofluidic flow by means of tethering.

In one embodiment, one end of the entity can be anchored on the ferroelectric substrate and the other end can contain a charge. Tethering can be the effect caused by the surface charges on the ferroelectric substrate induced by the electrodes.

A multi-layer micro/nanofluidic flow device containing microfluidic and nanofluidic channels was designed and fabricated to study the performance of electrically driven bio-nanovalves controlled by induced polarization of ferroelectric substrate. The microfluid channel comprised 200 μm (W)×25 μm (H) and 25 μm (W)×25 μm (H) straight channels, micro-nozzles, and microdiffusers. The multi-layer micro/nanofluidic flow device provided high driving pressure and low mass flow rate for fluid flow in the nanochannels. Lead-zirconium-titanate (PZT) substrate integrated with nano electrodes were grown on the bottom of nanochannels fabricated on glass substrates. The polarizable surface of the PZT layers can be used to control the motion of the nanovalves made of charged biological molecules. By observing the fluid mixing behavior variation in nanofluid channels of 200 nm (W)×200 nm (H) before and after the polarization of the PZT substrate, the function of the bio-nanovalves was demonstrated.

In a traditional pressure-driven fluid flow device, the driving pressure is directly applied to a fluid flow channel to overcome longitudinal flow friction. For microscale fluid flow, the common pressure supply devices, e.g. gear pumps or syringe pumps, can generate sufficient driving pressure for fluid flow. Even turbulent flow has been achieved in microchannels using the regular pressure-driven pumping. However, as fluid channel dimension decreases to the nanoscale, the pressure gradient of fluid flow becomes more challenging. Assuming laminar flow condition, the pressure drop along the fluid channel can be described by the following equation:

$$\Delta P = \rho g f \frac{l}{D_h} \frac{v^2}{2g} \propto \frac{Ql}{D_h^4} \text{ where} \quad (1)$$

$$f = 64/\text{Re} = 64 \bigg/ \left(\frac{\rho v D_h}{\mu}\right) \quad (2)$$

and $\Delta P$ is the longitudinal pressure drop in micro/nanochannels, $\rho$ is the fluid density, g is gravity, v is the fluid longitudinal velocity, l is the micro/nanochannel length, $D_h$ is the inner hydraulic diameter of micro/nanochannels, Q is the volumetric flow rate, and $\mu$ is the fluid viscosity. Therefore, the pressure drop is inversely proportional to the fourth order of the cross sectional dimension of micro/nanochannels. For example, for a minimum flow rate of 1 μl/min characteristic of syringe pumps, a pressure drop of 48 MPa is required to pump fluid through a 200 nm diameter, 6 μm long, nanochannel. This already exceeds the holding strength of conventional connectors, tubings, and other conventional devices, as well as difficulty for the tubing connect without microchannels. In order to control the pressure less than 2 atm in the same nanochannel, the flow rate is predicted to be 4 nl/min, which is well below the range of conventional syringe pumps. Therefore, an alternative design for nanochannels can be used for the inventive nanofluidic device.

This invention provides a novel multi-layer nanofluidic flow device, which comprises layers of ferroelectric material, control electrodes, nanochannels, microchannels and a biomolecular valve within the nanochannels to open and close the fluid flow passage. The microfluid channels can comprise 200 μm (W)×25 μm (H) and 25 μm (W)×25 μm (H) straight channels, micro-nozzles, and micro-diffusers, designed to provide sufficient driving pressure and low mass flow rate for fluid flow in the nanochannels. The nanochannels can be connected in parallel to the microchannels through three vias. Fluid flow in the microchannels can consume a large percentage of the syringe pump and provides an appropriate reduced fluid flow in the nanochannels, which is driven by the pressure drop of microfluidic flow between the connecting vias. With the inventive design, it possible to reach 0.01 pl/min in the nanochannels without damaging the multi-layer micro/nanofluidic flow device with excessively high pressure drops from the syringe pump system.

Figure 11:
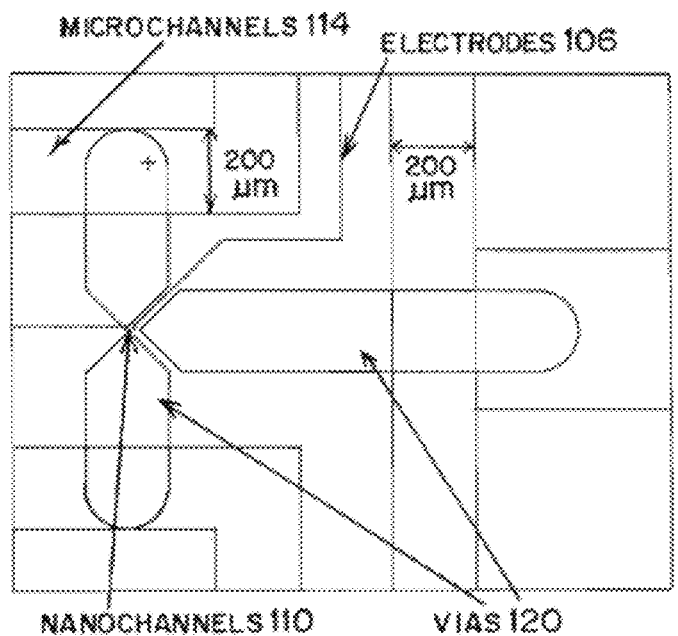
FIG. 11 is a top view of microchannels, vias, electrodes, and nanochannels in the multi-layered micro/nanofluidic flow device.
Figure 13:
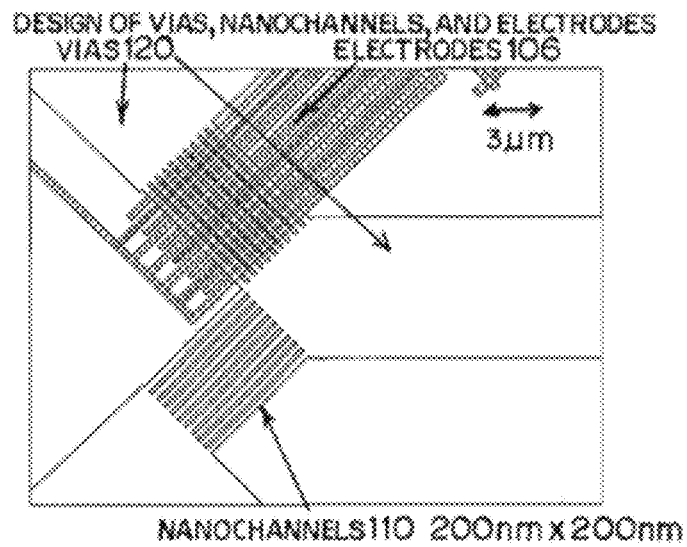
FIG. 13 is a top view of a multi-layered micro/nanofluidic flow device illustrating the design of the vias, nanochannels and electrodes.

The multi-layer micro/nanofluidic flow device can comprise two major independent parts: (1) nanochannels, nano-electrodes, and a ferroelectric material layer on a conductive indium tin oxide (ITO) electrode layer grown on a glass substrate and patterned using e-beam lithography, lift-off, sol-gel, sputtering, and reactive ion etching (RIE) techniques; and (2) PDMS microchannels fabricated using photolithography. After alignment and wafer bonding of the two pieces, a complete fluid device can be accomplished with two fluid inlets and one outlet, such as shown in FIG. 9. The microchannels can comprise a variety of channel shapes and dimensions, e.g. 200 μm (W)×25 μm (H) channel, 25 μm (W)×25 μm (H) channel, diffusers, and nozzles. The major and minor pressure loss along the narrow channels, diffuser, and nozzles can provide the pressure gradient for the parallel fluid flow through connecting vias and nanochannel. As the design of microchannel pattern, which comprises two inlet and one exit, the two groups of ten 200 nm (W)×200 nm (H)×6 μm (L) nanochannels (FIG. 13) connect with the microchannels through two inlet connecting vias and one exit connect allowing the observation of nano-mixing or nanochemical reaction behavior at the outlet, as shown in FIG. 11. One group of nanochannels can be designed to overlap electrodes for the electrically driven nanovalve control. Each nanochannel can share a flow rate, such as about 82 μl/min when the flow rate in each microchannel is about 11 μl/min.

The left side of FIG. 16 illustrates a micro/nano fabrication process for a nanochannel piece and multi-layer micro/nanofluidic flow device. A thin film of ferroelectric material $PbZr_{0.42}Ti_{0.58}O_3$ (PZT) was synthesized via sol-gel on a conductive indium tin oxide (ITO) layer on glass (Delta Technology), with the PZT layer serving three purposes for the multi-layer micro/nanofluidic flow device. First, the transparent PZT material gives optical access for fluid flow measurement from the backside; second, the variation of the polarization of PZT, controlled by the electrodes, can actuate the biomolecules which function as a bionanovalve; third, PZT is resistant to trifluorofluoroperoxymethane ($CF_4/O_2$) reactive ion etching (RIE) compared to silicon nitride ($Si_3N_4$) which is a very good etch stopper in the subsequent process needed to complete the device. Electron-beam resist (ZEP520, Zeon) was spin-coated on the surface of PZT and exposed to electrode lithography and patterning using a JEOL 9300 (JEOL) 100 KV electron beam lithography tool. The electrode pattern was produced using xylenes with reactive sputtering at 30 nm Pd and 150 nm gold (Au) for electrode and alignment mark purposes using an ATC 2400 (AJA International) sputtering system. After lift-off using a remover 1165 (Shipley), the electrode pattern resulted in a pair of electrode combs with 200 nm wide fingers in which the variation of voltage, frequency, and poles of electricity connected can be used to control the polarization of PZT film (layer) between the indium tin oxide (ITO) at the bottom electrode and palladium (Pd) combs providing the top electrodes. A thin film 200 nm of silicon nitride ($Si_3N_4$) can be reactive-sputtered on the surface of PZT and electrode for a nanochannel pattern and nanochannel layer. The substrate can be spin-coated with ZEP520 again for e-beam exposure of the nanochannel patterns to form nanochannels and vias. High resolution alignment of electrodes and nanochannel patterns is preferred. In one test, the selectivity of reactive ion etching (RIE) rate of $Si_3N_4$ to resist, ZEP520, the etch mask, was measured at 1:1. The pattern was established and etched using tetrafluoromethane ($CF_4$) at a flow rate of 50 sccm+oxygen ($O_2$) at a flow rate of 5 sccm at a pressure of 100 m Torr and temperature of 20° C. and a power wattage of 150 W by Plasmalab System 100 (Oxford Instruments).

Figure 14:
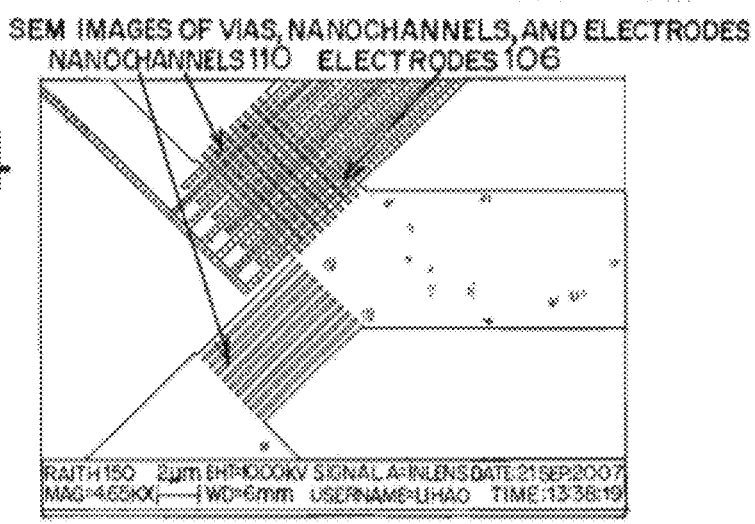
FIG. 14 illustrates SEM images of vias, nanochannels and electrodes in the multi-layered micro/nanofluidic flow device.
Figure 15:
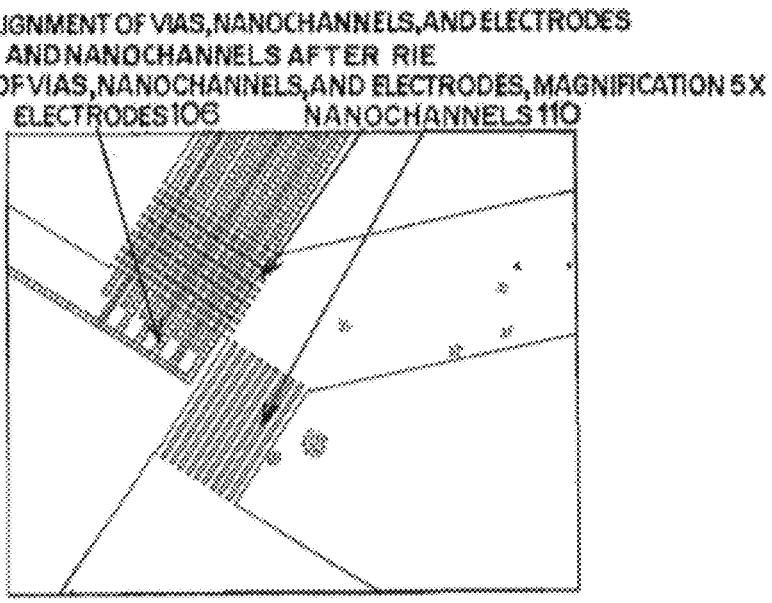
FIG. 15 is a top view of a multi-layered micro/nanofluidic flow device illustrating the design and alignment of vias, nanochannels and electrodes after reactive ion etching (RIE).
Figure 21:
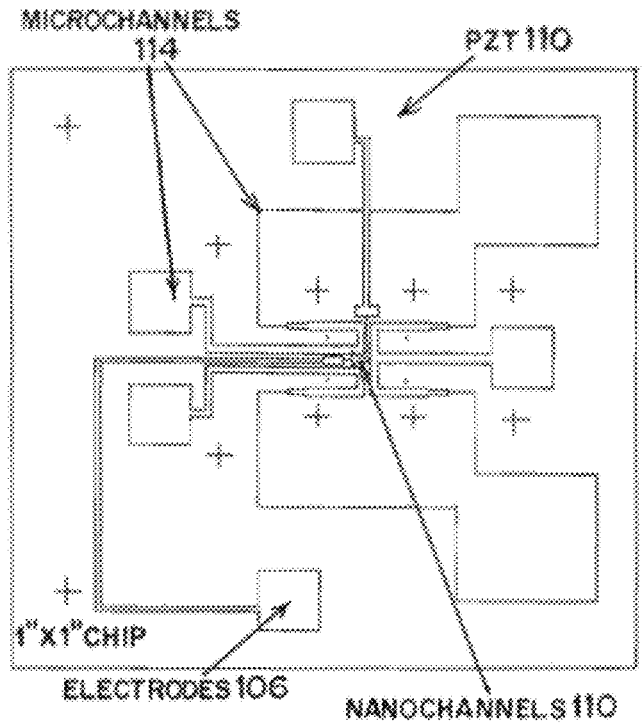
FIG. 21 is a top view of the multi-layer micro/nanofluidic flow device illustrating the microchannels, PZT, electrodes and nanochannels.
Figure 22:
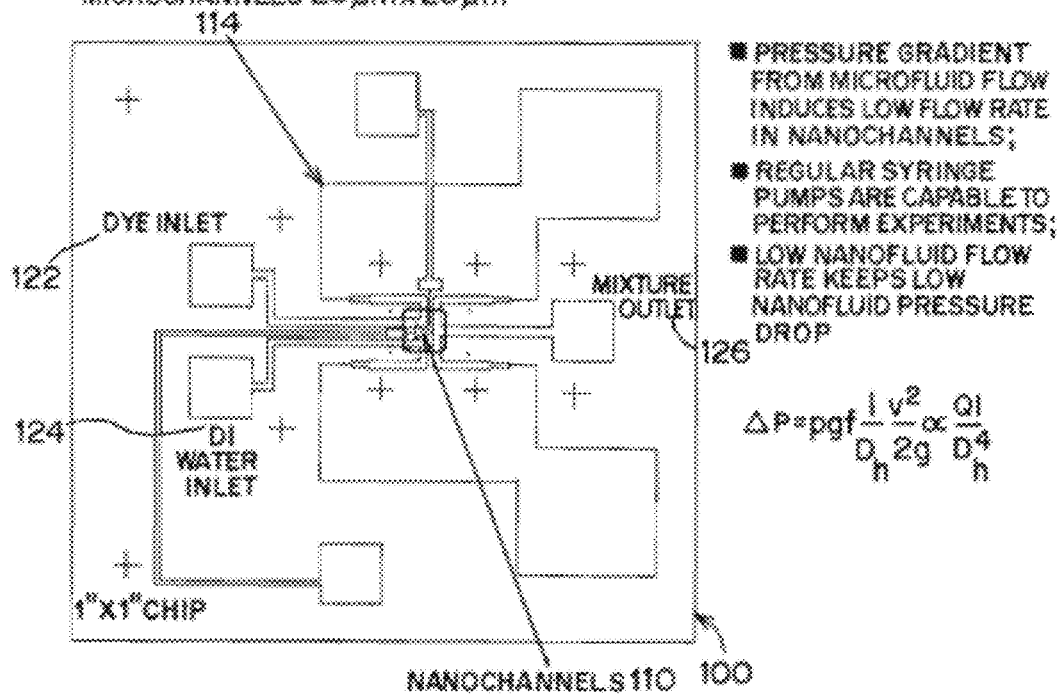
FIG. 22 is a top view of the multi-layer micro/nanofluidic flow device illustrating a dye inlet, a distilled (DI) water inlet, a mixture outlet, microchannels and nanochannels.
Figure 25:
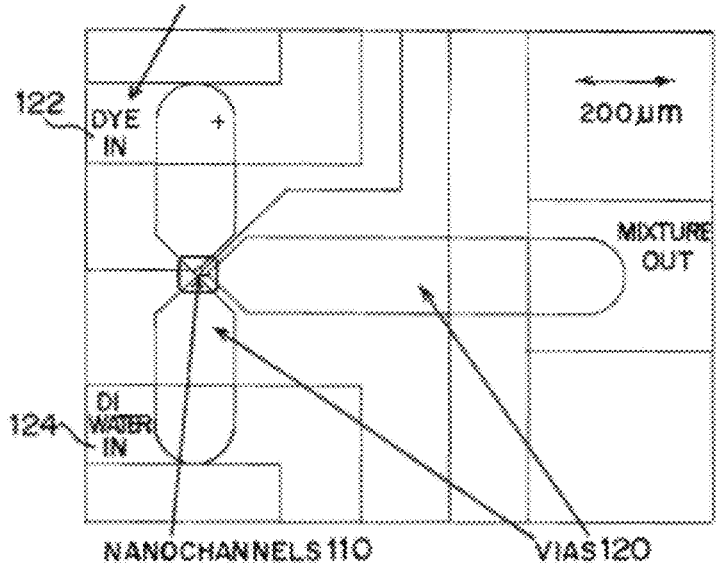
FIG. 25 is a top view of the multi-layer micro/nanofluidic flow device illustrating a dye inlet, a distilled (DI) water inlet, a mixture outlet, microchannels, nanochannels, and vias.
Figure 26:
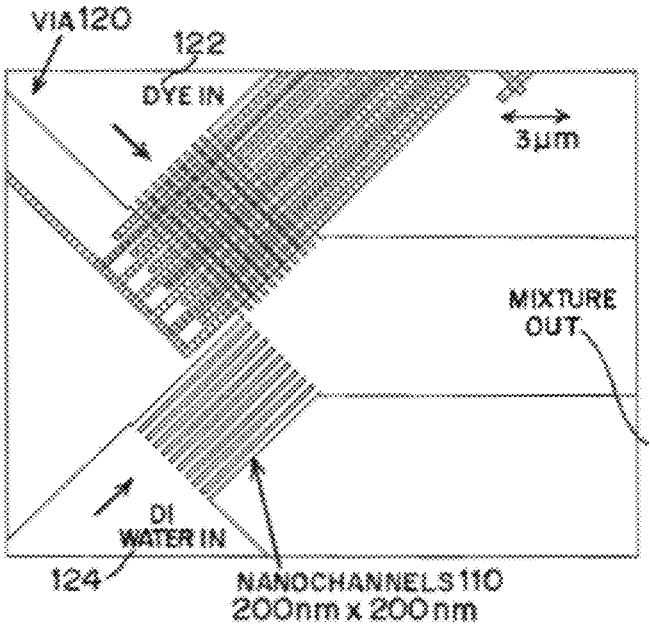
FIG. 26 is a top view of the multi-layer micro/nanofluidic flow device illustrating the dye inlet, a distilled (DI) water inlet, a mixture outlet, vias and nanochannels.
Figure 32:
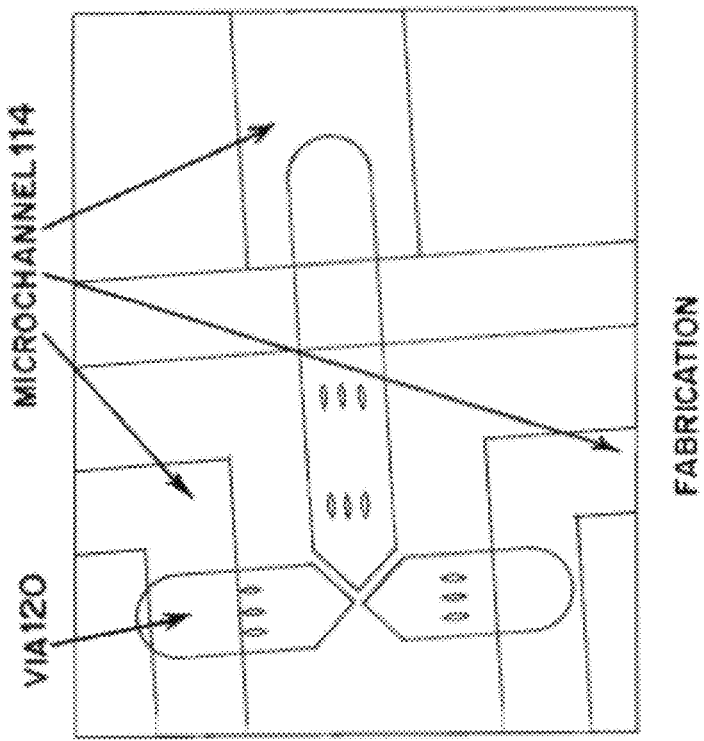
FIG. 32 is a top view of a design of microchannels, nanochannels, and vias.
Figure 33:
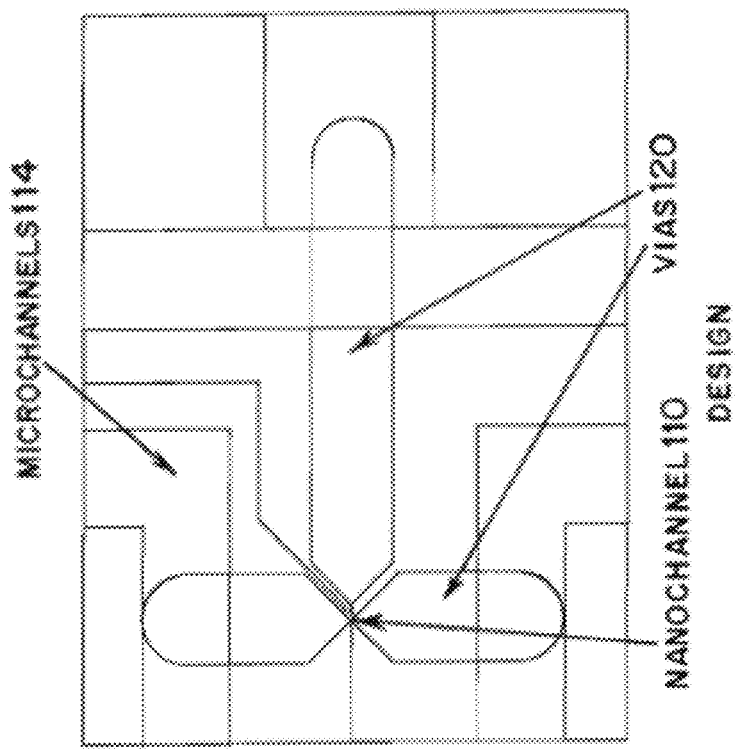
FIG. 33 is a top view of a design of vias and microchannels.
Figure 34:
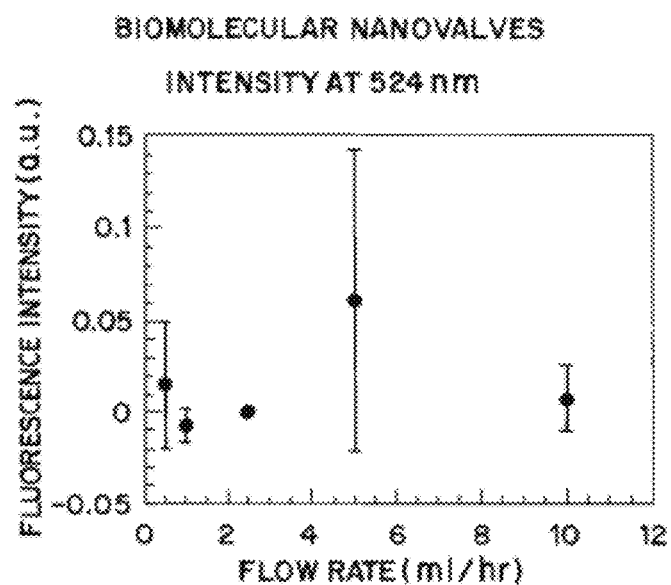
FIG. 34 is a graph of the fluorescent intensity and flow rate of biomolecular (bio) nanovalves.
Figure 35:
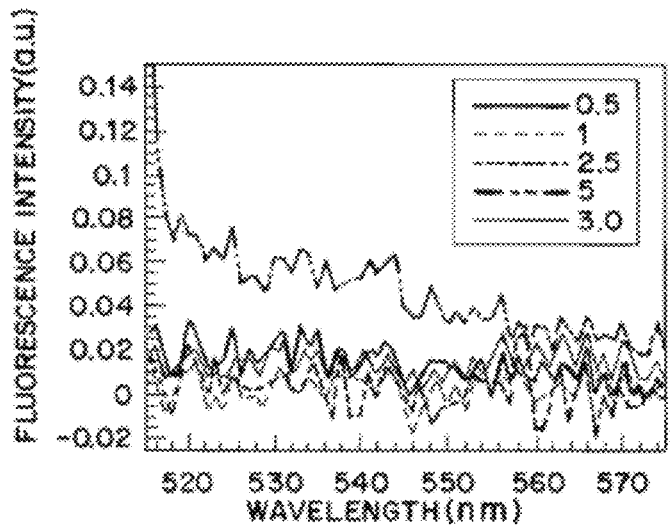
FIG. 35 is a graph of the fluorescent intensity and wavelength of biomolecular (bio) nanovalves.
Figure 36:
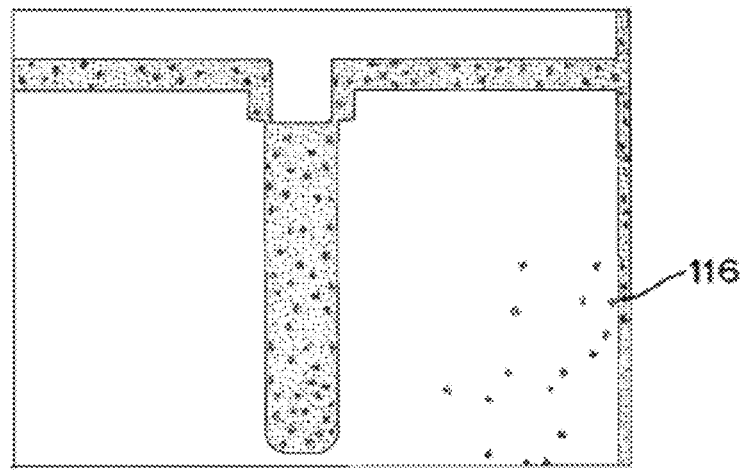
FIG. 36 is a top view of biomolecular (bio) nanovalves.
Figure 37:
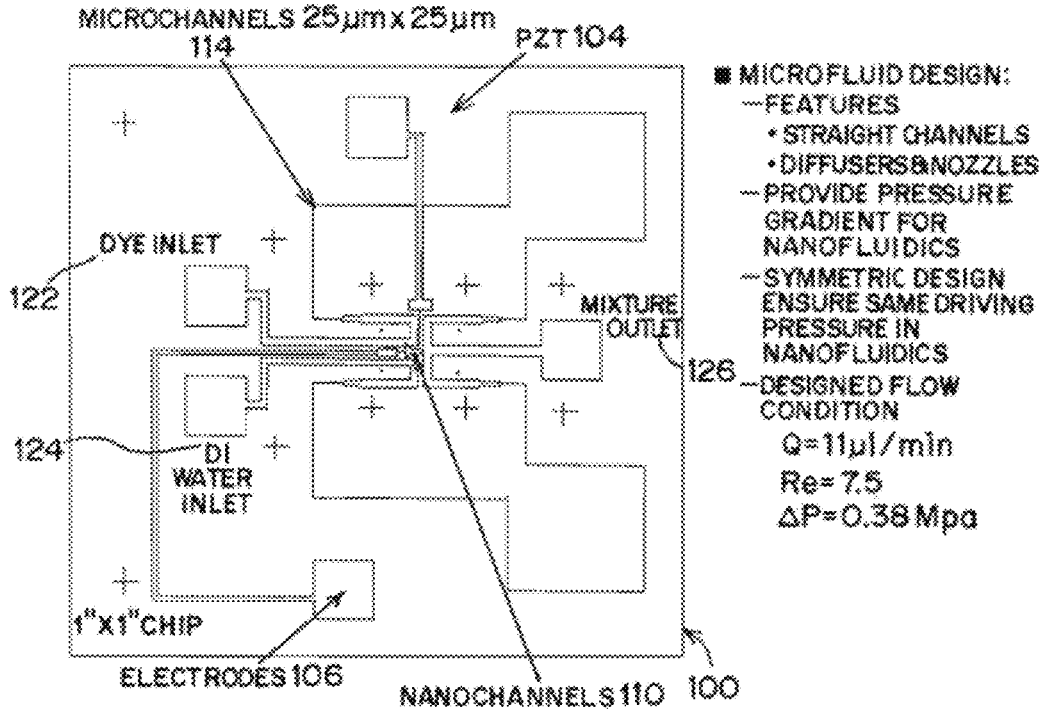
FIG. 37 is a top view of the multi-layer micro/nanofluidic flow device illustrating the vias, microchannels, electrodes and nanochannels.
Figure 38:
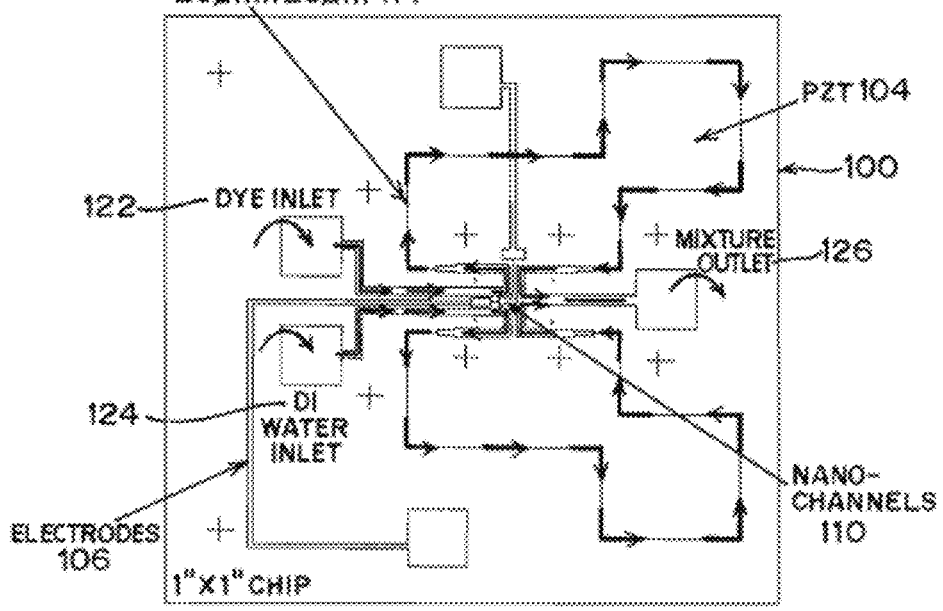
FIG. 38 illustrates the flow patterns in the multi-layer micro/nanofluidic flow device with microchannels, PZT, electrodes and nanochannels.

The alignment of electrodes and nanochannels patterns was demonstrated in a SEM image as shown in FIG. 14 which was obtained with a Raith 150 system. FIG. 15 illustrates an optical microscopic image in dark field at magnification 100× which verifies good alignment of the electrodes and nanochannels patterns.

The right side of FIG. 16 illustrates the micro/nano fabrication process with microchannels molded on a silicon (Si) wafer 136 and fabricated by photolithography to form wide microchannels 114, such as 200 μm wide channels, diffusers, nozzles, and long narrow microchannels, such as 25 μm wide long narrow microchannels, with a uniform thickness, such as at 25 μm. The mold can be prepared using photoresist partially cured epoxy resin (SU8) 138 (MicroChem,) with a mask aligner MA6 (Karl Suss). Polydimethylsiloxane (PDMS) elastomer (Dow Corning) can be used as the bulk material for the microchannels. The polydimethylsiloxane (PDMS) prepolymer can be mixed with a curing agent at a 10:1 ratio and degassed before being cast over the mold. The cast PDMS can be cured in a convection oven at 60° C. for 2 hr.

The assembly of the multi-layer micro/nanofluidic flow device can commence with the removal of polydimethylsiloxane (PDMS) from the mold. The PDMS with microchannels can be trimmed and punched for access holes. Both the microchannel piece and nanochannel piece can be put in plasma deposition curing equipment, such as a Plasmalab System 100, for $O_2$ plasma treatment, such as at 20 W, 30 mTorr, 10 s. The multi-layer micro/nanofluidic flow device can be kept in a convection oven at 100° C. for 1 hr for post treatment for complete adhesion at the PDMS/$Si_3N_4$ interface. Flexible tubing can be coated with a room temperature vulcanizing (RTV) sealant and inserted into the access holes in the PDMS. Additional sealant can be applied for a complete seal. The sealant can be allowed to fully cure for 2 days. This method for bonding should be strong enough for the high pressure gradient in a flow test.

Figure 12:
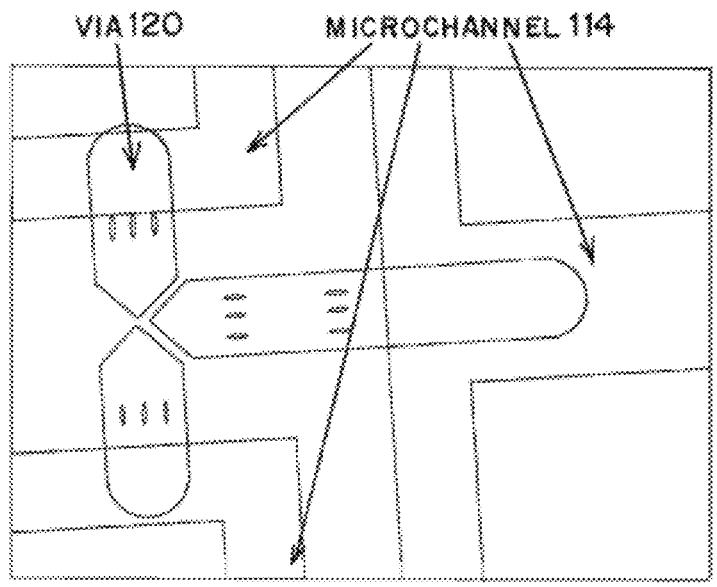
FIG. 12 is a top view of a multi-layered micro/nanofluidic flow device illustrating alignment of the microchannels and vias.

The bright field image of FIG. 12 illustrates the alignment between the nanochannel substrate and polydimethylsiloxane (PDMS) of the microchannels after bonding at a magnification of 5×. The bonded substrates can be connected with flexible tubing 134 (FIG. 10) to fabricate a multi-layer micro/nanofluidic flow device.

The SEM images of FIGS. 17 and 18 illustrate the cross-section of the nanochannels. To measure the cross-sectional dimension of the nanochannels, a test piece of silicon nitride and silicon ($Si_3N_4$/Si) can be used. After reactive ion etching (RIE), the nanochannels can be milled using a focused-ion beam (FIB or FEI). Tungsten can be deposited on the silicon nitride ($Si_3N_4$) layer to increase the image contract. The thickness of silicon nitride ($Si_3N_4$) was measured to be 180 nm by locating the interface of silicon nitride ($Si_3N_4$) and silicon (Si). The top and bottom width of the nanochannels was measured at 220 nm and 175 nm respectively. Observation of the interface of $Si_3N_4$ and Si illustrated in FIG. 16 indicates that $Si_3N_4$ has been etched through and the Si underneath the $Si_3N_4$ layer was damaged. However, in the multi-layer micro/nanofluidic flow device, in which the floor material of nanochannels is PZT, to which the etch selectivity of $Si_3N_4$ is high, the PZT floor of nanochannels can provide and function as a thin film of etch stopper according to etch test and, therefore, can prevent $Si_3N_4$ over-etching.

To illustrate the capability of the multi-layer micro/nanofluidic flow device for nanofluidic experiments, a nanomix experiment was performed by pumping two different fluids through the multi-layer micro/nanofluidic flow device. A high concentration Rhodamine B solution and DI water were selected as the fluids pumped through the multi-layer micro/nanofluidic flow device by a syringe pump (PHD2000, Harvard Apparatus) at 8.3 μl/min and mixed after the nanochannels and microchannels. No leak was observed. Most of the fluid flowed through the microchannels and flowed out the exit of microchannels without mixing due to laminar flow characteristics. Under the pressure gradient between the upstream and downstream vias, a small amount of fluid was pumped through the nanochannels. In contrast to microfluidic behavior, diluted pink fluid was observed at the exit vias indicating fully or partially mixed fluid after nanochannels, as shown in FIG. 19. The possible reasons could be: (1) the relatively high roughness in the vias and nanochannels which introduce more turbulence in nanofluidic flow; (2) nanofluidic behavior; and (3) the effect of expanding geometry between nanochannels and exit via.

With the multi-layer micro/nanofluidic flow device, it is now possible to conduct fluidic research at the nanoscale. Using the advantage of increased surface-to-volume ratio and short diffusion time due to scale reduction, accurate control of fluids and more effective performance for mixing, bio/chemical (bio-chemical) reactions and heat transfer can be achieved with the multi-layer micro/nanofluidic flow device. The researcher can accurately control nanofluidics, to concentrate nanoelements and to mix nanofluidic materials using this invention.

The multi-layer micro/nanofluidic flow device can have many uses. The multi-layer micro/nanofluidic flow device can be used as a sorter or concentrator with a DC/AC controller for sorting/concentrating nano-scaled elements in fluids. The collected nanoelements can be accumulated at a high concentration for study, research or supply for industry and bio/medical applications, e.g. on-demand drug delivery. Nanomixing is also possible with the multi-layer micro/nanofluidic flow device. The bio-nanovalves can be useful for applications including lab-on-a-chip and release-on-demand drug delivery systems. The multi-layer micro/nanofluidic flow device can also be used to study the basic science of fluid flow and heat transfer at a nanoscale with the purpose of improvement of flow and heat transfer efficiency in nanoscale devices.

As previously indicated, a novel design of multi-layer fluid device has been developed for micro/nanofluidics study. The multi-layer micro/nanofluidic flow device can utilize micro/nano-fabrication technologies, including e-beam lithography, photolithography, reactive sputtering, sol-gel, lift-off, and wafer bonding. The multi-layer micro/nanofluidic flow device gives an easy step to accomplish nanofluidic flow without the worry about the high pressure in nanochannels or low volumetric flow rate beyond the range of regular pumps. A simple nanomix experiment was performed to demonstrate the capability of the multi-layer micro/nanofluidic flow device. The multi-layer micro/nanofluidic flow device can be used for nanofluidics, nanomixing, nano-chemical-reactions, AC/DC control, and as a protein sorter and concentrator.

There is increasing significance of micro/nanofluidic systems on chemical reaction, drug delivery, mixing, heat transfer enhancement, biological sensing, and fluidic control. Using the advantage of increased surface-to-volume ratio and short diffusion time due to the scale reduction, high accurate control of fluids and more effective performance for mixing, bio/chemical (bio-chemical) reactions, and heat transfer can be achieved. Further investigation of fluid behavior at the nanoscale and effects associated with chemical, electronic, and biological applications will help achieve a full understanding of micro/nanofluidics and apply the advantages of micro/nanofluidics more effectively.

Among the many advantages of the multi-layer micro/nanofluidic flow devices are:
1. Superior capability for use in micro/nanofluidics.
2. Outstanding performance.
3. Superb equipment for fluidic research at the nanoscale.
4. Excellent use as a sorter or concentrator.
5. Good potential for bio-medical applications.
6. Useful for nanomixing and nano-chemical reactions.
7. User friendly.
8. Reliable.
11. Durable
12. Easy to fabricate.
13. Economical.
14. Attractive.
15. Efficient.
16. Effective.

Although embodiments of the invention have been shown and described, it is to be understood that various modifications, substitutions, and rearrangements of parts, components, and/or process (method) steps, as well as other uses, shapes, fabrication, construction, and design of the multi-layer micro/nanofluidic flow devices can be made by those skilled in the art without departing from the novel spirit and scope of this invention.

What is claimed is:

1. A multi-layer micro/nanofluidic flow device, comprising:
   a substrate;
   a conductive layer comprising ferroelectric material positioned on said substrate;
   electrodes connected to said conductive layer;
   a nanofluidics layer positioned on said conductive layer and defining nanochannels;
   a microfluidics layer positioned upon the nanofluidics layer and defining microchannels; and
   biomolecular nanovalves providing bio-nanovalves operatively associated with said nanochannels and moveable from a closed position to an open position for controlling fluid flow at a nanoscale, said bio-nanovalves being activated by polarization of the conductive layer.

2. A multi-layer micro/nanofluidic flow device in accordance with claim 1 wherein:
   said conductive layer of ferroelectric material comprises a PZT layer of lead zirconate titanate ($Pb(Zr_xTi_{1-x})O_3$) (PZT); and
   said substrate comprises indium tin oxide coated glass (ITO glass).

3. A multi-layer micro/nanofluidic flow device in accordance with claim 1 wherein said substrate comprises silicon.

4. A multi-layer micro/nanofluidic flow device in accordance with claim 1 defining reservoirs or vias.

5. A multi-layer micro/nanofluidic flow device in accordance with claim 1 including:
   a dye inlet for inflow (ingress) of a dye comprising a fluid;
   a water inlet for inflow (ingress) of water or distilled (DI) water; and
   a mixture outlet for outflow (egress) of said dye and water.

6. A multi-layer micro/nanofluidic flow device in accordance with claim 1 wherein:
   said substrate, conductive layer comprising ferroelectric material layer, electrodes, nanofluidics layer, nanochannels, microfluidics layer, microchannels, and bio-nanovalves cooperate with each other to provide a multi-layer micro/nanofluidic flow device;
   said multi-layer micro/nanofluidic flow device can be used in at least one of the following applications: fluidic research at a nanoscale, control of fluids, bio-chemical reactions, heat transfer, controlling nanofluidics, sensing, gating, concentrating nanoelements, mixing, mixing nanofluidic materials, sorting, concentrating, studying fluid flow and heat transfer at a nanoscale, studying micro/nanofluidics, nano-chemical-reactions, AC/DC control, as a protein sorter and concentrator, biological sensing, fluidic control, drug delivery, nanomixing, lab-on-a-chip, and bio-medical applications.

* * * * *